(12) United States Patent
Song

(10) Patent No.: US 8,837,067 B2
(45) Date of Patent: Sep. 16, 2014

(54) METHOD AND APPARATUS FOR CONTIGUOUS DATA ADDRESS MANAGEMENT

(75) Inventor: Jae Ik Song, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/458,994

(22) Filed: Apr. 27, 2012

(65) Prior Publication Data

US 2013/0038960 A1 Feb. 14, 2013

(30) Foreign Application Priority Data

Apr. 27, 2011 (KR) ................. 10-2011-0039707

(51) Int. Cl.
*G11B 5/09* (2006.01)
*G11B 20/10* (2006.01)
(52) U.S. Cl.
CPC ...... *G11B 20/10* (2013.01); *G11B 2020/10953* (2013.01)
USPC .................................................... 360/49
(58) Field of Classification Search
None
See application file for complete search history.

(56) References Cited

U.S. PATENT DOCUMENTS

| | | | |
|---|---|---|---|
| 7,440,221 B2 | 10/2008 | Tsuchinaga | |
| 7,982,994 B1 | 7/2011 | Erden | |
| 8,179,627 B2 | 5/2012 | Chang | |
| 8,270,256 B1 | 9/2012 | Juang | |
| 2007/0030588 A1 | 2/2007 | Tsuchinaga | |
| 2011/0078393 A1* | 3/2011 | Lin | ............................ 711/155 |
| 2011/0085266 A1 | 4/2011 | Kanai | |
| 2011/0222186 A1 | 9/2011 | Itakura | |
| 2011/0292545 A1 | 12/2011 | Katada | |
| 2012/0060073 A1 | 3/2012 | Itakura | |
| 2012/0069466 A1 | 3/2012 | Okamoto | |
| 2012/0082019 A1 | 4/2012 | Harigae | |
| 2012/0099216 A1 | 4/2012 | Grobis | |
| 2012/0162808 A1 | 6/2012 | Masuda | |
| 2012/0194937 A1 | 8/2012 | Tagami | |

OTHER PUBLICATIONS

Garth Gibson, Directions for Shingled-Write and Two-Dimensional Magnetic Recording System Architectures: Synergies with Solid-State Disks, Carnegie Mellon University, May 2009,pp. 1-2, Pittsburgh, US.

* cited by examiner

*Primary Examiner* — Wayne Young
*Assistant Examiner* — Mark Fischer
(74) *Attorney, Agent, or Firm* — Cesari & Reed LLP; Kirk A. Cesari; Christian W. Best

(57) ABSTRACT

Methods and apparatuses for contiguous data address management are provided. In one embodiment, an apparatus may comprise a processor configured to receive a write command including data to be written to a plurality of logical block addresses (LBAs); determine if the plurality of LBAs includes LBAs from a plurality of logical bands; and when the plurality of LBAs includes LBAs from a plurality of logical bands, combine the plurality of logical bands into a single logical band and write the data to the single logical band. In another embodiment, the processor may be further configured to separate the single logical band into the plurality of logical bands when the data written to the plurality of LBAs becomes invalid.

17 Claims, 24 Drawing Sheets

FIG. 17

|      |      |      |      |      |
|------|------|------|------|------|
| SN00 | SN01 | SN02 | SN03 | SN04 |
| SN05 | SN06 | SN07 | SN08 | SN09 |
| SN10 | SN11 | SN12 | SN13 | SN14 |
| SN15 | SN16 | SN17 | SN18 | SN19 |
| SN20 | SN21 | SN22 | SN23 | SN24 |

VB00

|      |      |      |      |      |
|------|------|------|------|------|
| SN00 | SN01 | SN02 | SN03 | SN04 |
| SN05 | SN06 | SN07 | SN08 | SN09 |
| SN10 | SN11 | SN12 | SN13 | SN14 |
| SN15 | SN16 | SN17 | SN18 | SN19 |
| SN20 | SN21 | SN22 | SN23 | SN24 |

VB01

|      |      |      |      |      |
|------|------|------|------|------|
| SN00 | SN01 | SN02 | SN03 | SN04 |
| SN05 | SN06 | SN07 | SN08 | SN09 |
| SN10 | SN11 | SN12 | SN13 | SN14 |
| SN15 | SN16 | SN17 | SN18 | SN19 |
| SN20 | SN21 | SN22 | SN23 | SN24 |

VB02

|      |      |      |      |      |
|------|------|------|------|------|
| SN00 | SN01 | SN02 | SN03 | SN04 |
| SN05 | SN06 | SN07 | SN08 | SN09 |
| SN10 | SN11 | SN12 | SN13 | SN14 |
| SN15 | SN16 | SN17 | SN18 | SN19 |
| SN20 | SN21 | SN22 | SN23 | SN24 |

VB03

METHOD AND APPARATUS FOR CONTIGUOUS DATA ADDRESS MANAGEMENT

CROSS-REFERENCE TO RELATED APPLICATIONS

This application claims priority under 35 U.S.C. §119(a) of Korean Patent Application No. 2011-0039707, filed on Apr. 27, 2011, the entire disclosure of which is hereby incorporated by reference.

BACKGROUND OF THE INVENTION

1. Field of the Invention

This specification relates to a writing method and a storage device using the same, and particularly, to a method for writing data having consecutive logical block addresses, and a storage device using the same.

2. Background of the Invention

A disk drive as one of storage devices writes data in a storage medium or read data from the storage medium according to a command issued by a host device, so as to contribute to a computer system operation. Various writing schemes are being researched to improve recording (writing) density of the disk drive. Also, a new access method for a storage medium, which is appropriate for a new writing method for increasing writing density, is demanded.

SUMMARY OF THE INVENTION

In one embodiment, an apparatus may comprise a processor configured to receive a write command including data to be written to a plurality of logical block addresses (LBAs); determine if the plurality of LBAs includes LBAs from a plurality of logical bands, each logical band including a unique range of consecutive LBAs of a data storage medium; and when the plurality of LBAs includes LBAs from a plurality of logical bands, combine the plurality of logical bands into a single logical band and write the data to the single logical band.

In another embodiment, a method may comprise receiving a write command including data to be written to a plurality of logical block addresses (LBAs); determining if the plurality of LBAs includes LBAs from a plurality of logical bands, each logical band including a unique range of consecutive LBAs of a data storage medium; and when the plurality of LBAs includes LBAs from a plurality of logical bands, combining the plurality of logical bands into a single logical band and writing the data to the single logical band.

In yet another embodiment, a computer readable storage medium stores a program to execute a method comprising: receiving a write command including data to be written to a plurality of logical block addresses (LBAs); determining if the plurality of LBAs includes LBAs from a plurality of logical bands, each logical band including a unique range of consecutive LBAs of a data storage medium; and when the plurality of LBAs includes LBAs from a plurality of logical bands, combining the plurality of logical bands into a single logical band and writing the data to the single logical band.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 17 is a view illustrating virtual bands for explaining a write operation in accordance with one exemplary embodiment with reference to FIGS. 18 to 23;

DETAILED DESCRIPTION OF THE INVENTION

An aspect of the detailed description is to provide a method for efficiently writing data having consecutive (continuous, successive) logical block addresses. Another aspect of the detailed description is to provide a storage device using the writing method. Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1A:
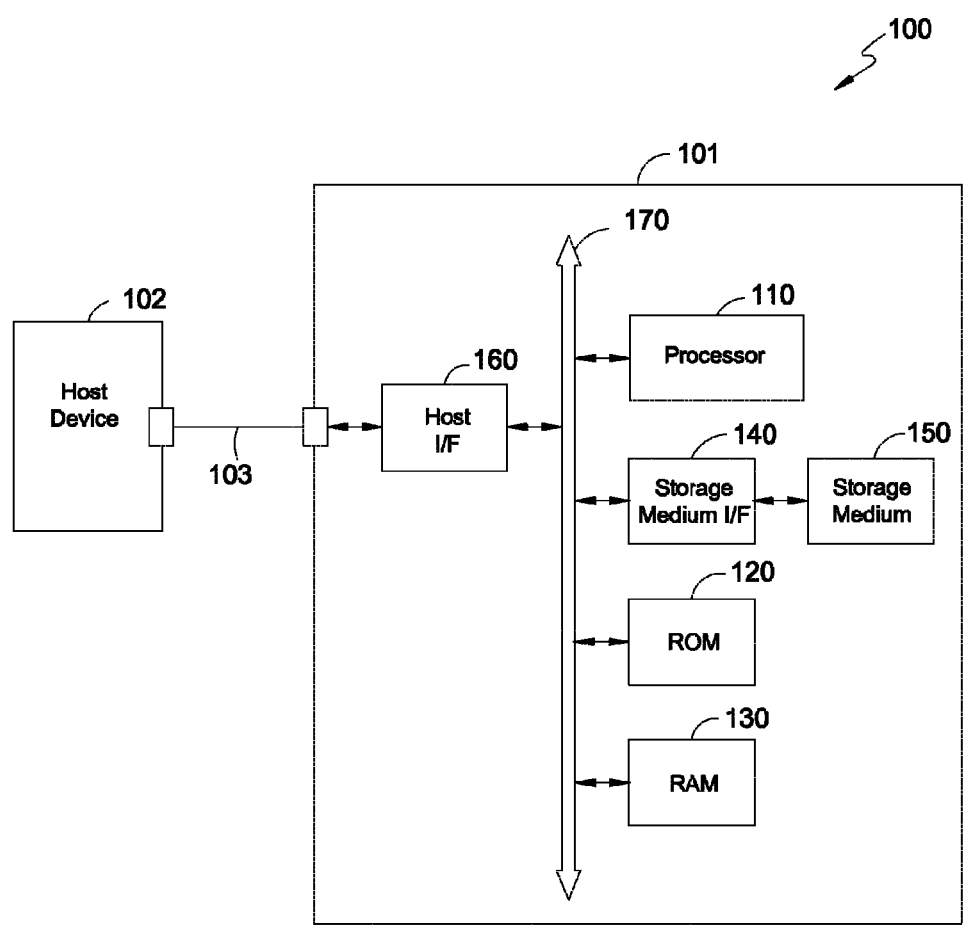
FIG. 1A is a block diagram of a computer system in accordance with one exemplary embodiment.

FIG. 1A is a block diagram of a computer system 100 in accordance with one exemplary embodiment.

As illustrated in FIG. 1A, a computer system may include a storage device 101, a host device 102 and a connector 103.

In detail, the storage device 101 may include a processor 110, a Read-Only Memory (ROM) 120, a Random Access Memory (RAM) 130, a storage medium interface (I/F) 140, a storage medium 150, a host interface 160, and a bus 170.

The host device 102 may issue a command for operating the storage device 101, and transmit the command to the storage device 101 connected via the connector 103 so as to perform a process of transmitting and receiving data to and from the storage device 101 according to the issued command.

The connector 103 is a unit for electrically connecting an interface port of the host device 102 to an interface port of the storage device 101, and may include a data connector and a power source connector. As one example, for using a Serial Advanced Technology Attachment (SATA) interface, the connector 103 may include a 7-pin SATA data connector and a 15-pin SATA power source connector.

Hereinafter, each component of the storage device 101 will be described.

The processor 110 may serve to interpret commands and control elements (components) of the data storage device according to the interpretation result. The processor 110 may include a code object management unit. The processor 110 may load code objects, which are stored in the storage medium 150, into the RAM 130 using the code object management unit. The processor 110 may load into the RAM 130 code objects for executing methods of FIG. 11, FIG. 13 and FIG. 15.

Figure 11:
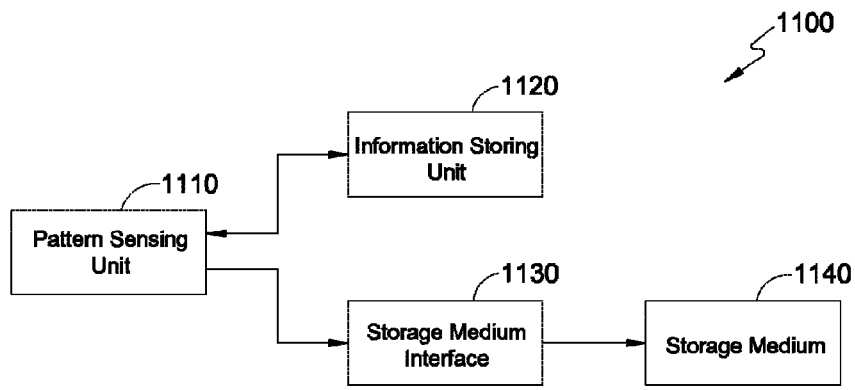
FIG. 11 is a block diagram of a storage device in accordance with one exemplary embodiment.
Figure 13:
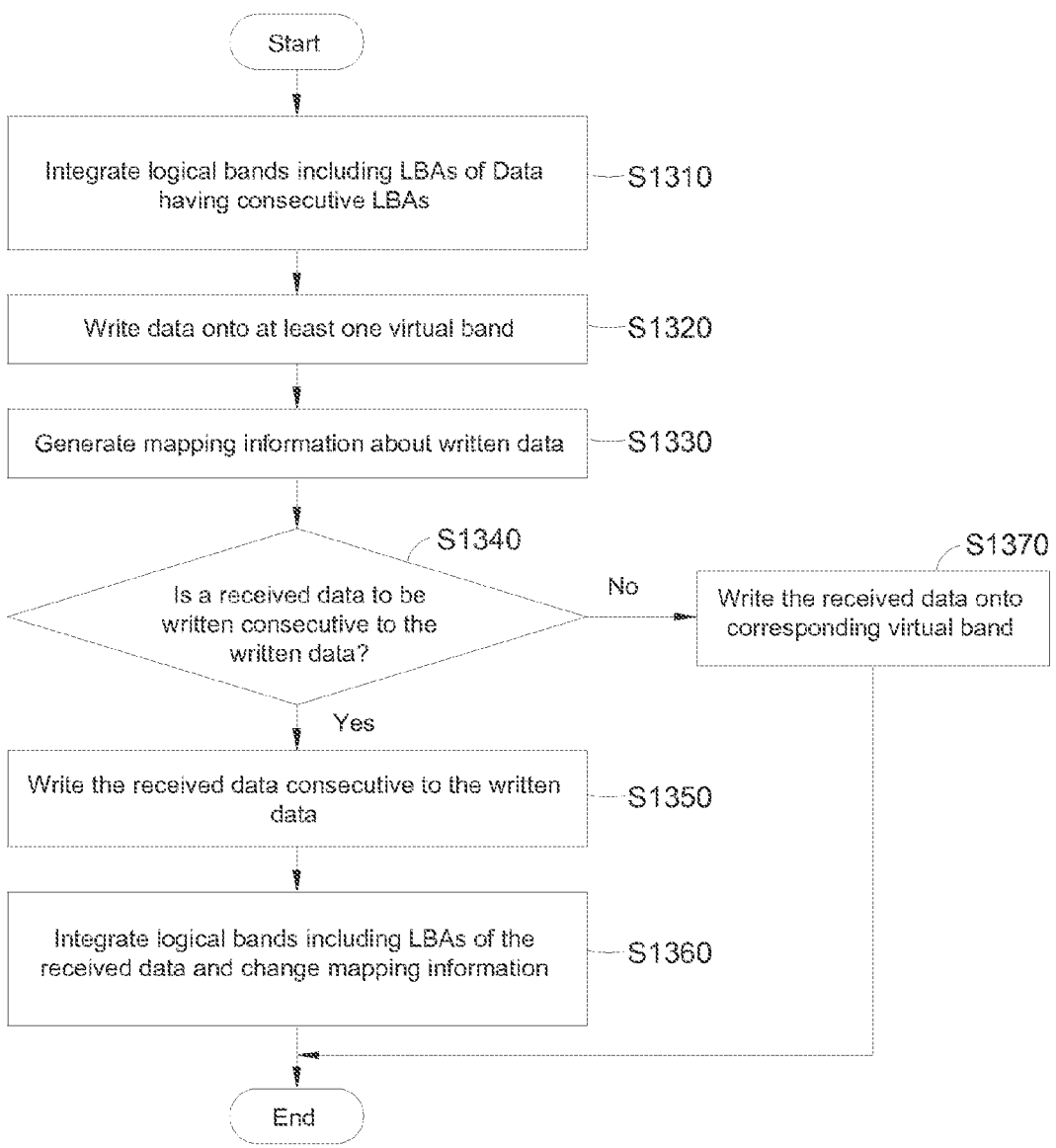
FIG. 13 is a flowchart illustrating a writing method in accordance with another exemplary embodiment.
Figure 15:
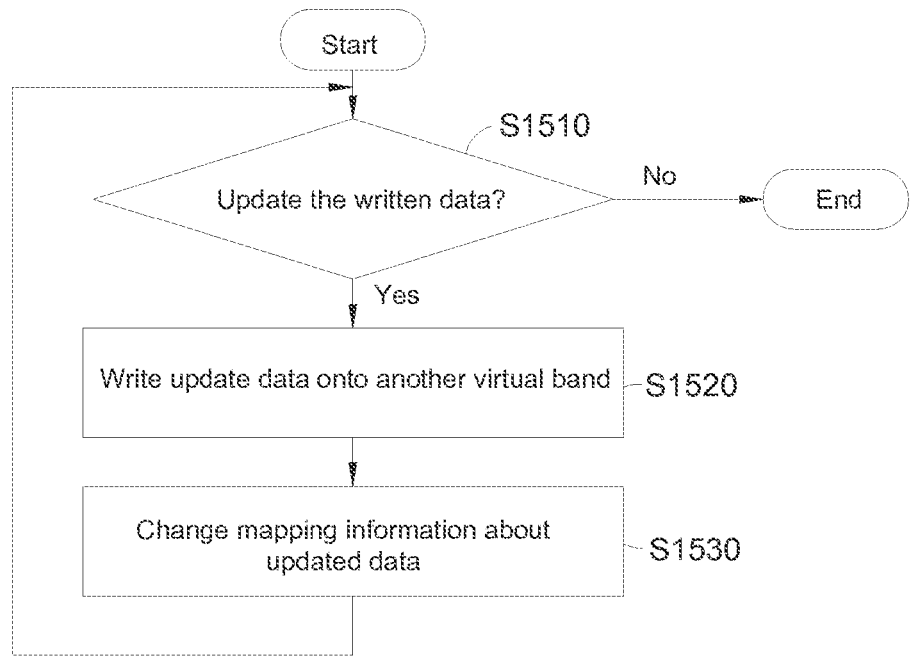
FIG. 15 is a flowchart illustrating a writing method for updating written data after performing a write operation in accordance with one exemplary embodiment.

The processor 110 may execute tasks for the methods of FIG. 11, FIG. 13 and FIG. 15 using the code objects loaded to the RAM 130. A data reading method and a data read operation through executed by the processor 110 and a write operation control method according to flowcharts will be explained in detail with reference to FIG. 11, FIG. 13 and FIG. 15.

The ROM 120 may store program codes and data which are necessary to operate the data storage device.

The program codes and the data stored in the ROM 120 or the storage medium 150 may be loaded into the RAM 130 according to the control by the processor 110.

The storage medium 150 may include a disk or a non-volatile semiconductor memory device as a main storage medium of the storage device. The storage device may include, for example, a disk drive. A detailed construction of a head disk assembly 300 having a disk and a head in a disk drive is illustrated in FIG. 3.

Figure 3:
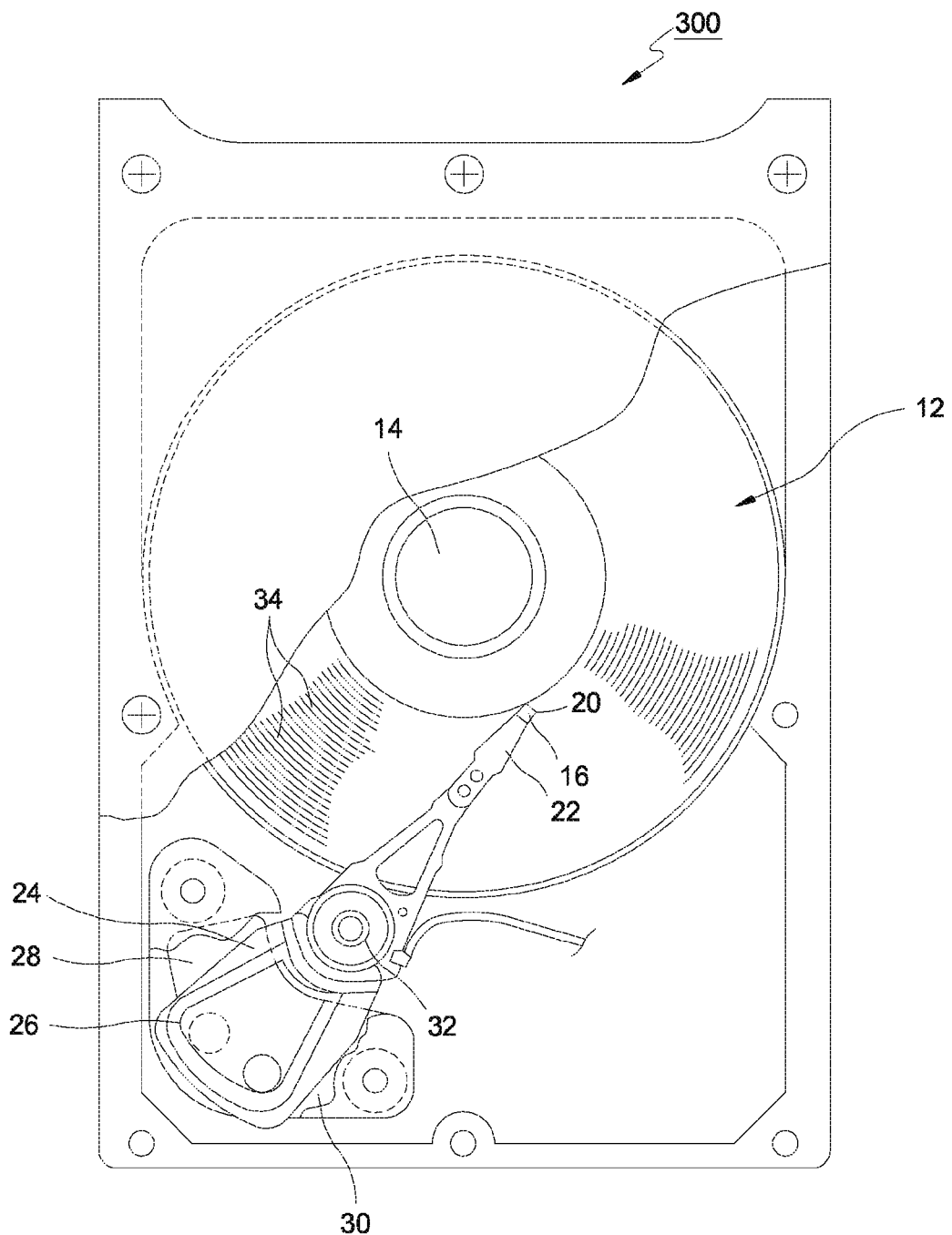
FIG. 3 is a planar view of a head disk assembly of a disk drive in accordance with one exemplary embodiment.

FIG. 3 is a planar view of a head disk assembly 300 of a disk drive in accordance with one exemplary embodiment.

Referring to FIG. 3, the head disk assembly 300 may include at least one disk 12 that is rotated by a spindle motor 14. The disk drive may further include a head 16 located adjacent to a surface of the disk 12.

The head 16 may sense a magnetic field of each disk 12 and magnetize the disk 12 to read or write information from or in the disk 12 as it rotates. Typically, the head 16 may be coupled to a surface of each disk 12. Although one head 16 is illustrated in FIG. 3, it should be understood that the head 16 includes a writing head for magnetizing the disk 12 and a separate reading head for sensing the magnetic field of the disk 12. The reading head may include a Magneto-Resistive (MR) device. The head 16 may also be referred to as a magnetic head or a transducer.

The head 16 may be integrated with a slider 20. The slider 20 may generate an air bearing between surfaces of the head 16 and the disk 12. The slider 20 may be coupled to a head gimbal assembly 22. The head gimbal assembly 22 may be attached onto an actuator arm 24 having a voice coil 26. The voice coil 26 may be located near a magnetic assembly 28 to define a Voice Coil Motor (VCM). A current supplied to the voice coil 26 may generate torque for rotating the actuator arm 24 with respect to a bearing assembly 32. The rotation of the actuator arm 24 may move the head 16 across the surface of the disk 12.

Information may be stored in annular tracks of the disk 12. Each of the tracks 34 may include a plurality of sectors. A sector configuration for annular tracks is illustrated in FIG. 5.

Figure 5:
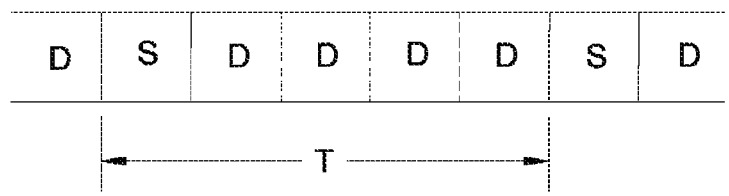
FIG. 5 is a view illustrating a sector architecture for one track of a disk as a storage medium applied to the present disclosure.

FIG. 5 is a view illustrating a sector architecture for one track of a disk as a storage medium applied to the present disclosure.

As illustrated in FIG. 5, one servo sector section T may include a servo area S and a data area. The data area may include a plurality of data sectors D. Alternatively, one servo sector section may include a single data sector D. The data sector D may also be referred to as a sector. In the servo information area S may be recorded, in detail, signals as illustrated in FIG. 6.

Figure 6:
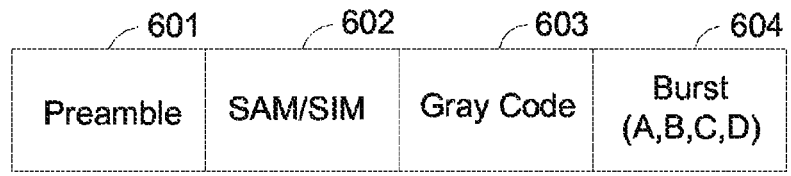
FIG. 6 is a view illustrating a structure of a servo information area illustrated in FIG. 5.

FIG. 6 is a view illustrating a structure of a servo area illustrated in FIG. 5.

Referring to FIG. 6, in the servo area S may be written a preamble 601, a servo synchronization indication signal 602, a gray code 603 and a burst signal 604.

The preamble 601 may provide clock synchronization during reading of servo information. Also, the preamble 601 may provide a specific timing margin by forming a gap before a servo sector. The preamble 601 may also be used to determine a gain (not illustrated) of an Automatic Gain Control (AGC) circuit.

The servo synchronization indication signal 602 may include a Servo Address Mark (SAM) and a Servo Index Mark (SIM). The SAM is a signal indicating a start of a servo sector, and the SIM is a signal indicating a start of a first servo sector on a track.

The gray code 603 may provide track information. The burst signal 604 is used to control the head 16 to follow a middle part of the tracks 34. As one example, the burst signal 604 may include four patterns of A, B, C and D. That is, a position error signal for tracking control may be generated from a combination of the four burst patterns A, B, C and D.

The disk 12 may be divided into a maintenance cylinder area that is not accessible by a user, and a user data area that is accessible by the user. The maintenance cylinder area may also be referred as a system area. Various types of information which are necessary to control a disk drive may be stored in the maintenance cylinder area. Of course, information required to perform a read operation control method and a write operation control method according to this specification may also be stored in the maintenance cylinder area. A mapping table for converting a Logical Block Address (LBA) into a Virtual Address (VA) based on a virtual zone or virtual band may be stored in the maintenance cylinder area.

The head 16 may be moved across the surface of the disk 12 to read information from or write information to other tracks. A plurality of code objects for enabling the disk drive to implement various functions may be stored in the disk 12. As one example, a code object for executing an MP3 player function, a code object for executing a navigation function, a code object for executing various video games and the like may be stored in the disk 12.

Referring back to FIG. 1A, the storage media interface 140 is a component to allow the processor 110 to access the storage medium 150 so as to read or write information. The storage medium interface 140 in the storage device which takes the form of a disk drive may include in detail a servo circuit for control of the head disk assembly 300, and a read/write channel circuit for processing a signal to read or write data.

The host interface 160 is a component for executing data transmission/reception to and from the host device 102, such as a personal computer, a mobile terminal and the like. For example, the host interface 160 may employ various types of interfaces, such as Serial Advanced Technology Attachment (SATA) interface, Parallel Advanced Technology Attachment (PATA) interface, Universal Serial Bus (USB) interface and the like.

The bus 170 may serve to transfer information among those elements of the storage device.

Hereinafter, description will be given of a software operation system of a disk drive as one example of a storage device, with reference to FIG. 2. That is, FIG. 2 illustrates a software operation system of the storage device 101 illustrated in FIG. 1A or the storage device 101' illustrated in FIG. 1B.

Figure 2:
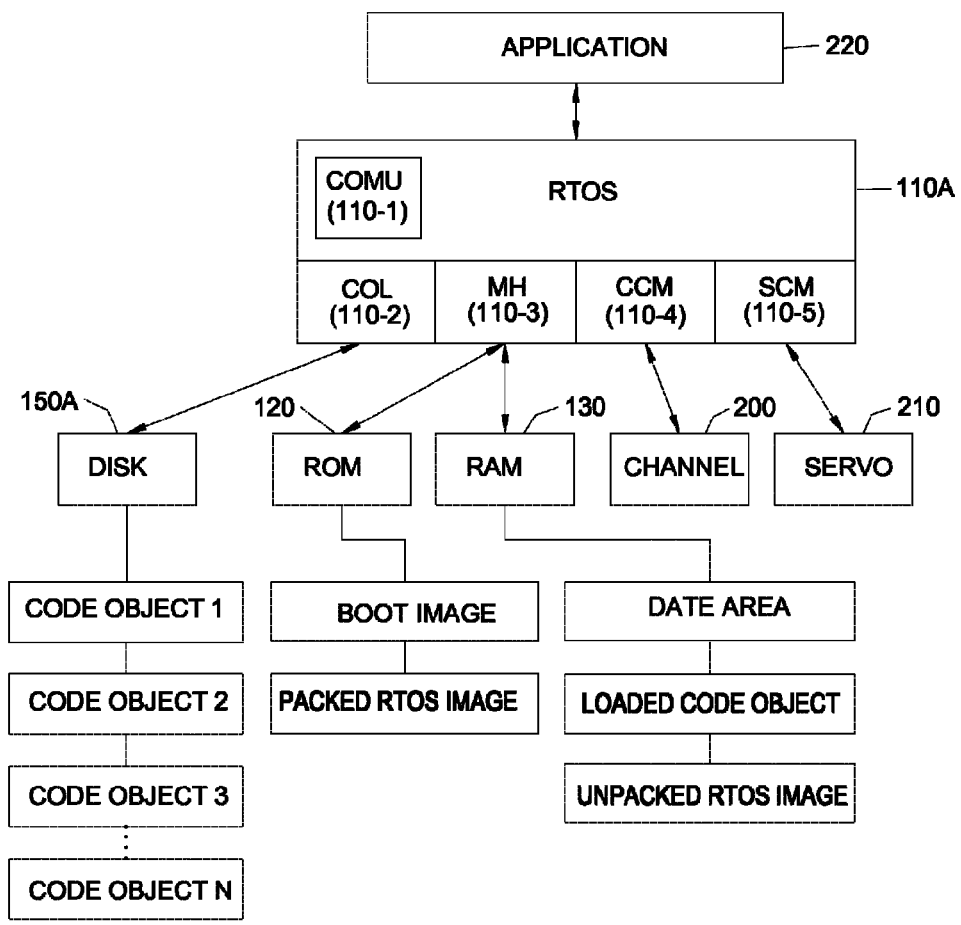
FIG. 2 is a software operation system view of the storage device illustrated in FIG. 1A or FIG. 1B.

As illustrate din FIG. 2, a disk 150A as a storage medium of a Hard Disk Drive (HDD) may store a plurality of code objects 1 to N.

The ROM 120 may store a boot image and a packed Real-Time Operating System (RTOS) image.

The disk 150A as the storage medium of the Hard Disk Drive (HDD) may store the plurality of objects 1 to N. The code objects stored in the disk 150A may include not only code objects for operating the disk drive but also code objects for performing various extendable functions of the disk drive. Especially, the disk 150A may store code objects for executing the writing methods illustrated in FIG. 11, FIG. 13 and FIG. 15. The code objects for executing the writing methods illustrated in FIG. 11, FIG. 13 and FIG. 15 may alternatively be stored in the ROM 120, instead of the disk 150A. In addition, the disk 150A may also store code objects for executing various functions, such as a MP3 player function, a navigation function, a video game function and the like.

An unpacked RTOS image obtained by reading a boot image from the ROM 120 during booting may be loaded to the RAM 130. In addition, code objects, which are stored in the disk 150A and necessary to execute the host interface, may be loaded to the RAM 130. The RAM 130 may also be allocated with an area DATA AREA for storing data.

Circuits required for processing signals to read or write data may be installed in a channel circuit 200. Also, circuits for controlling the head disk assembly 300 to read or write data may be installed in a servo circuit 210.

A Real Time Operating System (RTOS) 110A is a real-time operating system program, namely, a multi-program operating system using a disk. Depending on tasks, a real-time multiprocessing may be performed on a higher priority foreground task, and a batch processing may be performed on a lower priority background task. In addition, the RTOS 110A may load code objects from the disk and unload code objects to the disk.

The RTOS 110A may manage a Code Object Management Unit (COMU) 110-1, a Code Object Loader (COL) 110-2, a Memory Handler (MH) 110-3, a Channel Control Module (CCM) 110-4 and a Servo Control Module (SCM) 110-5 to execute tasks according to requested commands. The RTOS 110A may also manage application programs 220.

In detail, the RTOS 110A may load code objects, which are necessary to control a disk drive, to the RAM 130 when the disk drive is booted. Therefore, after booting, the disk drive may be operated using the code objects loaded to the RAM 130.

The COMU 110-1 may store position information where the code objects are written, and perform a bus arbitration process. The COMU 110-1 may also store information related to priorities of tasks being executed, and manage Task Control Block (TCB) information and stack information, required for executing tasks regarding the code objects.

The COL 110-2 may load the code objects stored in the disk 150A to the RAM 130 using the COMU 110-1, or unload the code objects stored in the RAM 130 to the disk 150A. Accordingly, the COL 110-2 may load the code objects, which are stored in the disk 150A and required for executing the writing methods of FIG. 11, FIG. 13 and FIG. 15, to the RAM 130.

The RTOS 110A may execute the writing methods of FIG. 11, FIG. 13 and FIG. 15, which will be explained later, using the code objects loaded to the RAM 130.

The MH 110-3 may write data to or read data from the ROM 120 and the RAM 130.

The CCM 110-4 may perform channel controlling required for processing a signal to write or read data, and the SCM 110-5 may control a servo system including the head disk assembly 300 for reading/writing data.

Figure 1B:
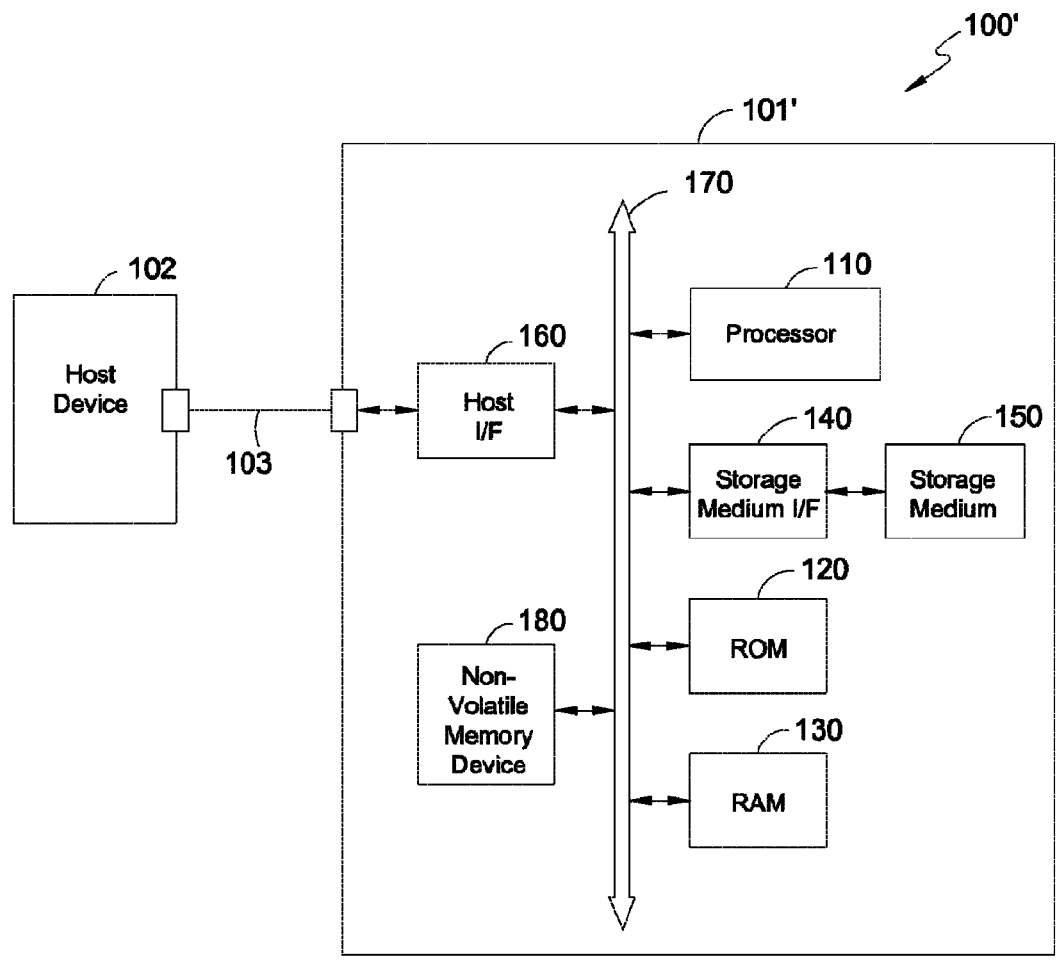
FIG. 1B is a block diagram of a computer system in accordance with another exemplary embodiment.

FIG. 1B is a block diagram of a computer system 100' in accordance with another exemplary embodiment of the present disclosure.

As illustrated in FIG. 1B, a storage device 101' of a computer system may further include a non-volatile memory device 180 in addition to the elements of the storage device 101 illustrated in FIG. 1A. The storage medium 150 of FIG. 1B may be implemented as a disk.

The non-volatile memory device 180 may be implemented as a non-volatile semiconductor memory device, for example, a flash memory, a Phase Change RAM (PRAM), a Ferroelectric RAM (FRAM), a Magnetic RAM (MRAM) and the like.

The non-volatile memory device 180 may store part or all of data desired to store in the storage device 101'. As one example, various information required for control of the storage device 101' may be stored in the non-volatile memory device 180.

Figure 12:
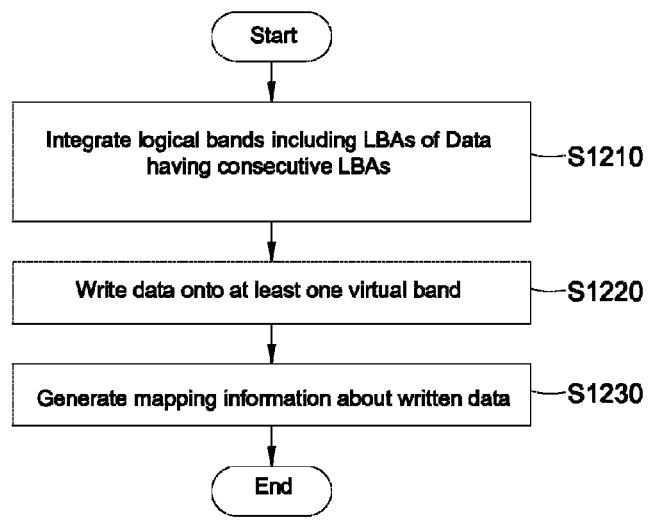
FIG. 12 is a flowchart illustrating a writing method in accordance with one exemplary embodiment.

The non-volatile memory device 180 may store program codes and information required for executing the writing methods of FIGS. 12, 13, and 15. Also, code objects for implementing various functions of the storage device may be stored in the non-volatile memory device 180. When the mapping table is stored in the non-volatile memory device 180, the storage device may load the mapping table stored in the non-volatile memory device 180 to the RAM 130.

The description of the same components which have been described in the computer system of FIG. 1A will not be repeated.

Figure 4A:
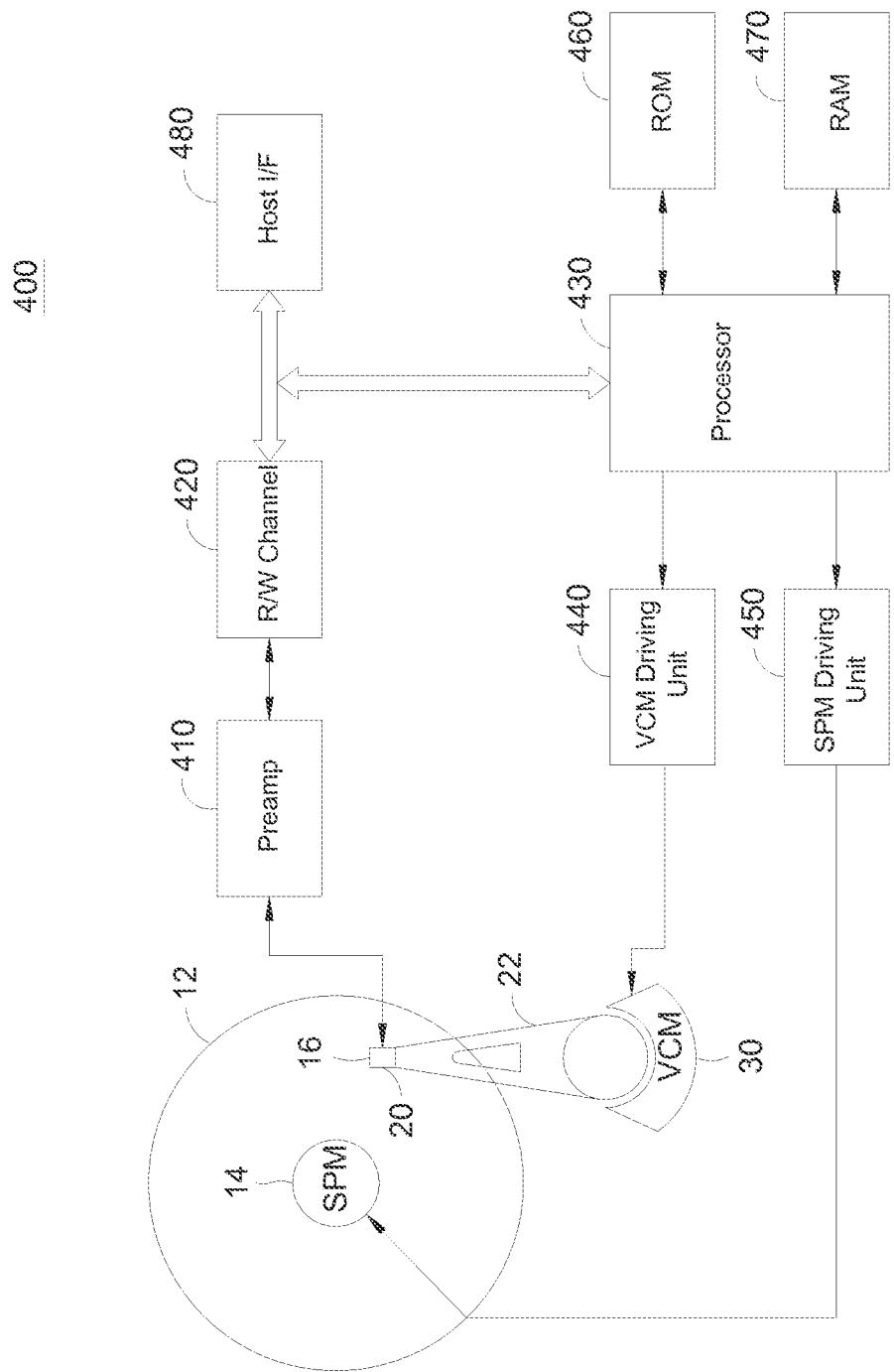
FIG. 4A is a an electric configuration view of a disk drive as one example of the storage device of FIG. 1A.

FIG. 4A is a view illustrating an electric circuit configuration of a disk drive 400 as one exemplary embodiment of the storage device 101 of FIG. 1A.

As illustrated in FIG. 4A, a disk drive 400 according to one exemplary embodiment of the present disclosure may include a pre-amplifier 410, a read/write (R/W) channel 420, a processor 430, a Voice Coil Motor (VCM) driving unit 440, a Spindle Motor (SPM) driving motor 450, a ROM 460, a RAM 470, and a host interface 480.

The processor 430 may be a Digital Signal Processor (DSP), a microprocessor, a microcontroller or the like. The processor 430 may control the R/W channel 420 to read information from or to write information to the disk 12 according to a command received from the host device 102 via the host interface 480.

The processor 430 may be coupled to the VCM driving unit 440 which supplies a driving current to drive a VCM 30. The processor 430 may supply a control signal to the VCM driving unit 440 to control movement of the head 16.

The processor 430 may also be coupled to the SPM driving unit 450 which supplies a driving current to drive the SPM 14. When power is supplied, the processor 430 may supply a control signal to the SPM driving motor 450 to rotate the SPM 14 at a target speed.

The processor 430 may be coupled to the ROM 460 and the RAM 470, respectively. The ROM 460 may store firmware and control data for control of the disk drive. The ROM 460 may also store program codes and information for executing the writing methods of FIG. 11, FIG. 13 and FIG. 15. Alternatively, the program codes and information for executing the writing methods of FIG. 11, FIG. 13 and FIG. 15 may be stored in a maintenance cylinder area of the disk 12, instead of the ROM 460.

Under the control of the processor 430, the program codes stored in the ROM 460 or the disk 12 may be loaded to the RAM 470 in an initialization mode, and data received via the host interface 480 or data read out of the disk 12 may be temporarily stored.

The RAM 470 may be implemented as a DRAM or SRAM. Also, the RAM 470 may be designed to operate in a Single Data Rate (SDR) manner or a Double Data Rate (DDR) manner.

The processor 430 may control the disk drive to execute the writing method of FIG. 11, FIG. 13 and FIG. 15 using the program codes and information stored in the ROM 460 or the maintenance cylinder area of the disk 12.

Figure 4B:
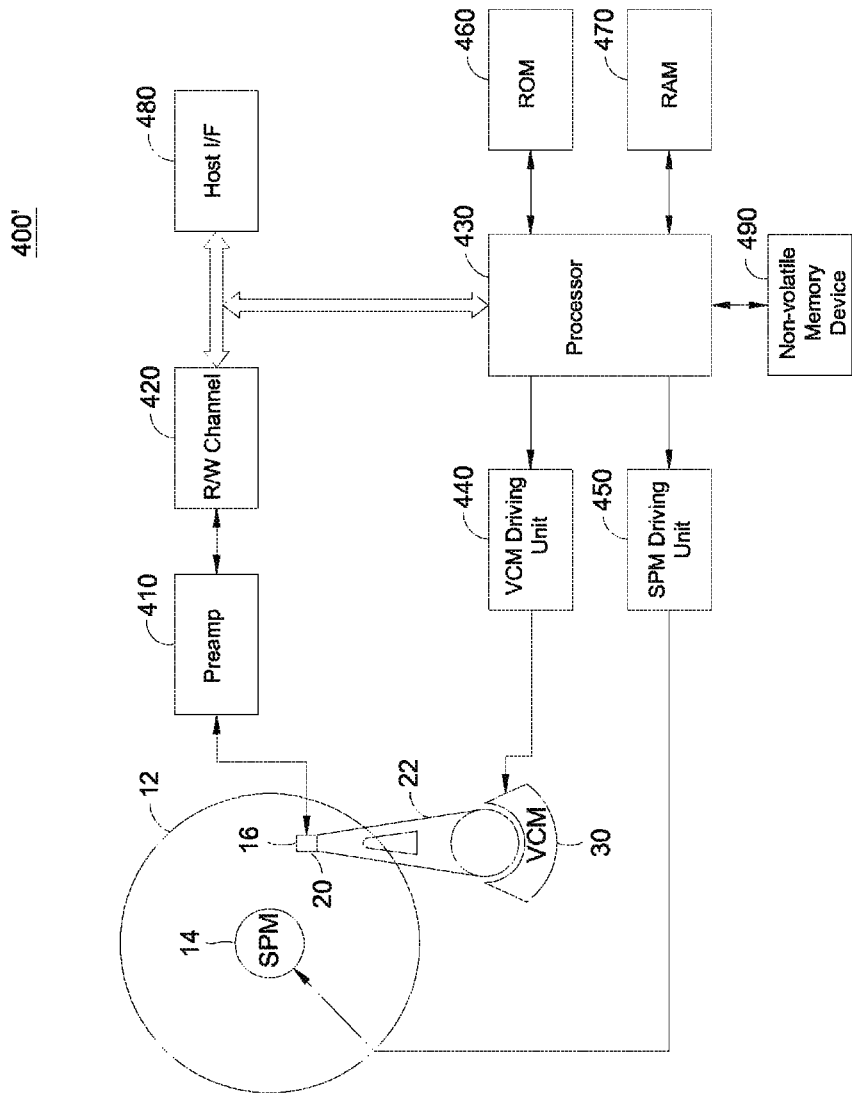
FIG. 4B is a an electric configuration view of a disk drive as one example of the storage device of FIG. 1B.

FIG. 4B is a view illustrating an electrical circuit configuration of a disk drive 400' as one example of the storage device 101' of FIG. 1B.

As illustrated in FIG. 4B, the disk drive 400' may further include a non-volatile memory device 490 as compared with the disk drive 400 illustrated in FIG. 4A. The non-volatile memory device 490 may store a part of data desired to be stored in the disk drive 400'. For example, various types of information required for control of the disk drive 400' may be stored in the non-volatile memory device 490.

The non-volatile memory device 490 may store program codes and information required for executing the writing methods of FIG. 11, FIG. 13 and FIG. 15. Also, code objects for implementing various functions of the storage device may be stored in the non-volatile memory device 490.

The processor 430 may be coupled to the ROM 460, the RAM 470 and the non-volatile memory device 490, respectively. The ROM 460 may store firmware and control data for control of the disk drive. The ROM 460 may also store program codes and information for executing the writing methods of FIG. 11, FIG. 13 and FIG. 15. Alternatively, the program codes and information for executing the writing methods of FIG. 11, FIG. 13 and FIG. 15 may be stored in a maintenance cylinder area of the disk 12 or the non-volatile memory device 490, instead of the ROM 460.

Under the control of the processor 430, the program codes stored in the ROM 460, the disk 12 or the non-volatile memory device 490 may be loaded to the RAM 470 in an initialization mode.

The description of the same components which have been described in the disk drive 400 of FIG. 4A will not be repeated.

Hereinafter, description will be given of a data read operation and a data write operation of a disk drive with reference to FIGS. 4A and 4B.

In a data read operation of the disk drive, the pre-amplifier 410 amplifies an electrical signal sensed from the disk 12 by the head 16. The R/W channel 420 then amplifies a signal output from the pre-amplifier 410 by using an automatic gain control circuit (not shown) that automatically varies a gain according to an amplitude of the signal, converts the electrical signal into a digital signal, and then decodes the digital signal to detect data. For instance, an error correction process ma be performed on the detected data by the processor 430 using a Reed-Solomon code, which is an error correction code, and then the detected data can be converted into stream data so as to be transmitted to the host device 102 via the host interface 480.

In a data write operation, the disk drive receives data from the host device via the host interface 480, and the processor 430 adds an error correction symbol using the Reed-Solomon code. The R/W channel 420 then encodes the data to be suitable for a write channel. Then, the data is written onto the disk 12 by the head 16 to which a write current amplified by the pre-amplifier 410 is applied.

Hereinafter, description will be given of an operation that the processor 430 executes the writing methods of FIG. 11, FIG. 13 and FIG. 15 using the program codes and information loaded to the RAM 470.

First of all, description will be given of a shingle-write scheme which is a newly proposed writing method to increase recording density in a disk drive as one of the storage device according to the present disclosure. The shingle-write is a scheme of executing a write operation in one direction such that tracks of a disk overlap each other in the form of tiles.

Figure 7:
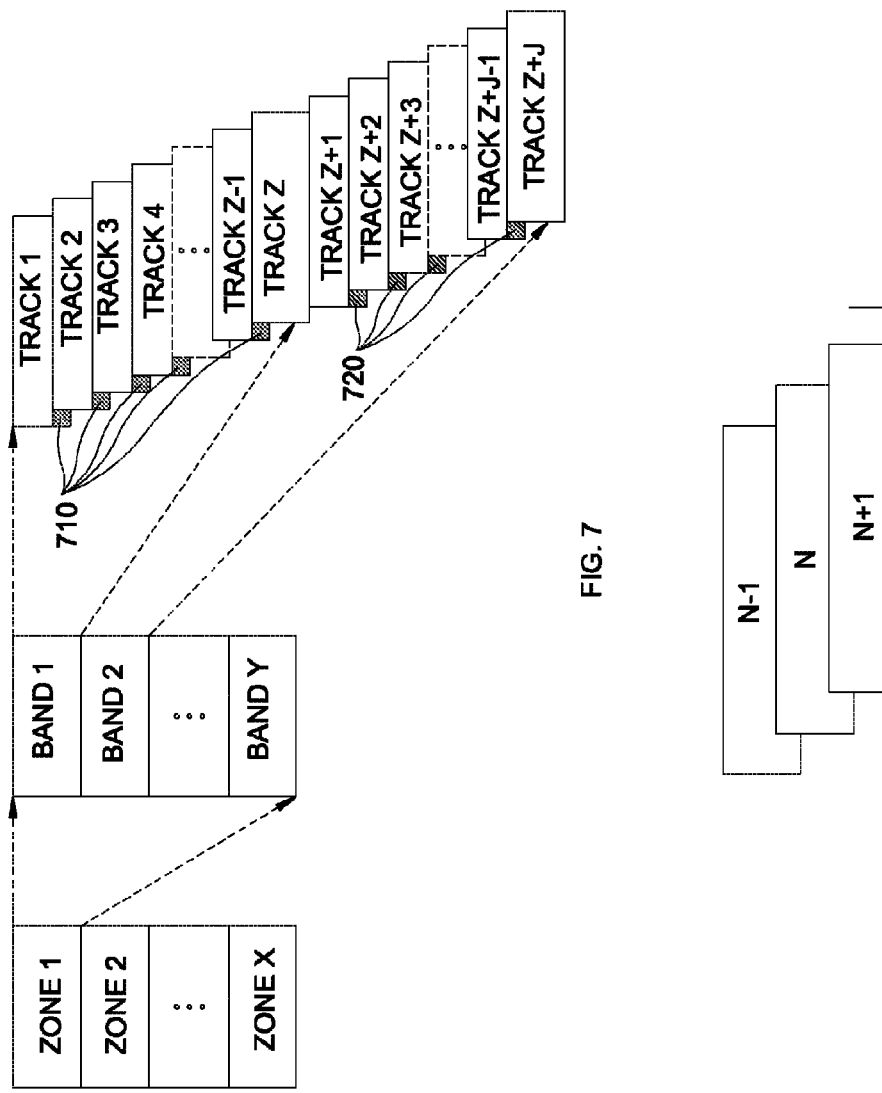
FIG. 7 is a view illustrating one exemplary embodiment of a storage medium employing a shingle-write scheme.

FIG. 7 is a view illustrating one exemplary embodiment of a storage medium using the shingle-write scheme.

As illustrated in FIG. 7, a storage medium may include X (here, X is a natural number) zones (ZONE 1 to ZONE X), one zone may include Y (here, Y is a natural number) bands (BAND1 to BAND Y), one band may include a plurality of tracks, and one track may include a plurality of data sectors (not shown). For example, referring to FIG. 7, BAND 1 may include Z (here, Z is a natural number) tracks, and BAND 2 may include J (here, J is a natural number) tracks. Each zone may include the same number of bands or a different number of bands. Also, each track may include the same number of sectors or a different number of sectors.

Data may be consecutively written on the tracks, which are included in each band BAND 1 to BAND Y, using the shingle-write scheme. For example, TRACK 2 may be overwritten on a partial area of TRACK 1, TRACK 3 may be overwritten on a partial area of TRACK 2, and TRACK Z may be overwritten on a partial area of TRACK Z−1. Hence, the storage medium with the structure illustrated in FIG. 7 may increase the characteristic of Track Per Inch (TPI) as recording (writing) density in a radial direction. Here, TRACK Z+1 as the first track of BAND 2 may not be overwritten on TRACK Z as the last track of BAND 1. Thus, the first track of each band may not be overwritten on the last track of the preceding band during the shingle-write. Reference numerals 710 and 720 of FIG. 7 indicate overwritten areas.

A received data to be written may be consecutively written on tracks of a corresponding virtual band. For example, a first received data to be written on BAND 1 may be written on Track 1, starting from the first data sector of TRACK 1, and a succeedingly received data to be written may be written on the corresponding track, starting from a data sector after the data sector which was previously written. When data has been written on every data sector of one track, the remaining data may be consecutively written on the next track adjacent to the one track, starting from a first data sector of the next track. Afterwards, upon reception of a read command, a new disk address may be dynamically allocated with respect to a logical block address (LBA) of each received data so as to perform a read operation.

FIG. 7 illustrates that each track has the same length for the sake of explanation. However, when data is written concentrically on a platter as done on a hard disk as a storage medium, for example, each track has a different length. Hence, when the storage medium is a disk such as the hard disk, an outer track may include more sectors than an inner track.

The storage medium in which the shingle-write is enabled by the structure illustrated in FIG. 7 may not be limited to the hard disk, but the structure enabling the shingle-write may be applicable when data is written on a storage medium having tracks.

Figure 8A:
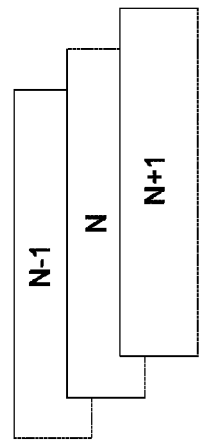
FIGS. 8A and 8B are views illustrating constraints at the time of writing data using the shingle-write scheme.
Figure 8B:
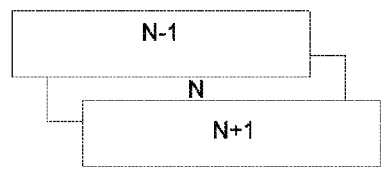

FIGS. 8A and 8B are views illustrating constraints at the time of writing data using the shingle-write scheme.

As illustrated in FIG. 8A, when data is written in an arrow-indicated direction using the shingle-write scheme in a storage medium having a structure of FIG. 8A, flux may be generated only in the arrow-indicated direction. Therefore, a constraint that TRACK N−1 cannot be written after writing on TRACK N. As illustrated in FIG. 8B, when TRACK N−1 is written in a reverse direction of the shingle-write progression after writing on TRACK N, data written on the TRACK N may be erased due to Adjacent Track Interference (ATI).

Therefore, to solve the problem, required is a technology of dynamically allocating a new disk address with respect to a Logical Block Address (LBA) provided by a host so as to always consecutively perform writing only in one of an inner circumferential direction or an outer circumferential direction of a disk.

Hereinafter, description will be given under assumption that a virtual address is used during a process of converting the LBA into Cylinder Head Sector (CHS) as a Physical Block Address (PBA) of the disk drive. That is, data may be written or stored data may be read using mapping information relating to the logical block address and the virtual address according to one exemplary embodiment.

Figure 9:
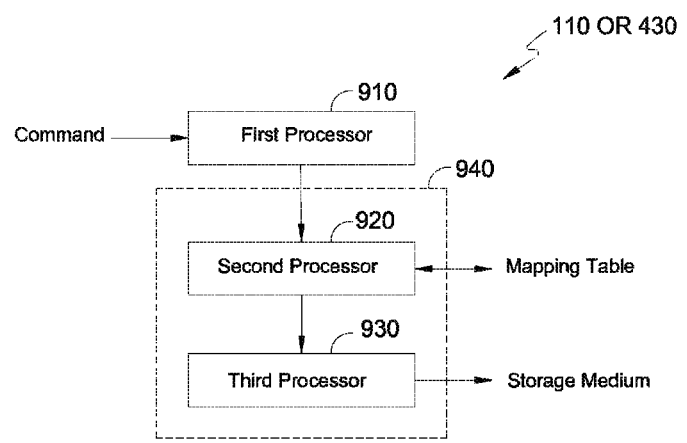
FIG. 9 is view illustrating one exemplary embodiment of a processor illustrated in FIG. 1A or 1B, or a processor of FIG. 4A or 4B.

FIG. 9 is view illustrating one exemplary embodiment of the processor 110 illustrated in FIG. 1A or 1B, or a processor 430 of FIG. 4A or 4B.

Figure 10:
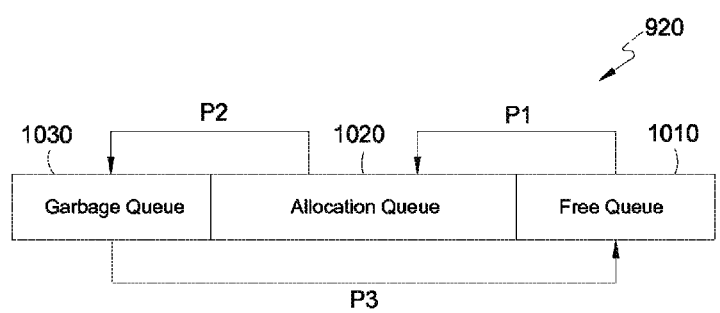
FIG. 10 is a view illustrating one exemplary embodiment of a second processor of FIG. 9.

FIG. 10 illustrates one exemplary embodiment of a second processor 920 of FIG. 9.

Referring to FIG. 1A or 1B, FIG. 4A or 4B and FIG. 9, the processor 110 or 430 may include a first processor 910, a second processor 920 and a third processor 930. Here, the second processor 920 and the third processor 930 may be integrated into one processor 940. Although not shown, the processor 910 and the second processor 920 may be designed to be integrated into one processor.

The first processor 910 may extract a logical block address designated by a received command.

The second processor 920 may convert the logical block address extracted by the first processor 910 into a virtual address. That is, the second processor 920 may convert the logical block address into the virtual address using a mapping table. The mapping table may include mapping information between the logical block address and the virtual address. The mapping table may be stored in an information storage unit 1120 of FIG. 11.

Referring to FIGS. 9 and 10, the second processor 920 may include a free queue 1010, an allocation queue 1020, and a garbage queue 1030. The second processor 920 may convert the logical block address designated by the received command into the virtual address using the free queue 1010, the allocation queue 1020 and the garbage queue 1030.

The second processor 920 may store in a free queue 1010 information related to virtual bands which have not been allocated to the logical band in a preset order. For example, a virtual band not allocated to the logical band may indicate a virtual band which does not include a data sector having valid data. The free queue 1010 is an element in which information related to virtual bands to be allocatable to a logical band according to a command are stored and wait for selection. The free queue 1010 may store those information related to virtual bands to be allocatable to a logical band for each physical zone in a sorting manner.

The second processor 920 may store information related to virtual bands allocated to the logical band in the allocation queue 1020. For example, when a virtual band, which has been allocated to a logical band including the logical block address designated by the received command, is not present on the mapping table or every virtual address, which belongs to a virtual band allocated to the logical band including the logical block address designated by the received command, has already completely been allocated, the second processor 920 may select one virtual band waited in the free queue 1010 and allocate the selected one virtual band to the logical band having the logical block address designated by the received command so as to move to the allocation queue 1020 (P1).

The second processor 920 may allocate a virtual address corresponding to the logical block address designated by the received command based on the virtual band allocated to the logical band stored in the allocation queue 1020. In detail, when a new virtual band has been allocated to the logical band having the logical block address designated by the received command and stored in the allocation queue 1020, the second processor 920 allocates a virtual address corresponding to a first data sector of the newly allocated virtual band to the logical block address designated by the received command.

When the virtual band which has already been allocated to the logical band having the logical block address designated by the received command is present in the allocation queue 1020, the second processor 920 may allocate a virtual address, which is unallocated in the corresponding virtual band, to the logical block address designated by the received command. For example, a virtual address for a data sector right after the last accessed data sector of the virtual band, which has already been allocated to the logical band having the logical block address, may be allocated to the logical block address designated by the received command.

The second processor 920 may select a virtual band, in which the number of virtual addresses invalidated due to data update exceeds a threshold value, from the virtual bands allocated to the logical band, and move the selected virtual band to the garbage queue 1030 (P2).

When the number of virtual bands stored in the free queue 1010 is less than an initially set minimum value, the second processor 920 performs a garbage collection process. That is, the second processor 920 reads data stored in a sector of valid virtual addresses of the virtual band stored in the garbage queue 1030, and rewrites the data to a virtual address defined in a newly allocated virtual band from the free queue 1010.

The second processor 920 may move information related to the virtual band, on which the rewriting has been performed, of the virtual bands stored in the garbage queue 1030, to the free queue 1010 (P3). Here, the virtual band on which the rewriting has been performed does not have valid data, and every data stored therein is invalid data.

The third processor 930 may convert the virtual address converted by the second processor 920 into a physical address of the disk, and control the storage device to access the storage medium according to the converted physical address. That is, the third processor 930 may convert the virtual address into Cylinder Head Sector (CHS) information indicating the physical position of the disk, and generate a VCM driving control signal for accessing the disk based on the converted CHS information.

Referring to FIGS. 4A and 4B, when the VCM driving control signal generated by the third processor 930 is applied to the VCM driving unit 440, the VCM driving unit 440 generates a VCM driving current corresponding to the VCM driving control signal and supplies the current to a VCM 30. In turn, the magnetic head 16 is moved to a track position of the disk desired to access, and performs a data write or read operation corresponding to a command.

FIG. 11 is a block diagram of a storage device 1100 in accordance with one exemplary embodiment.

As illustrated in FIG. 11, the storage device 1100 may include a pattern sensing unit 1110, an information storage unit 1120, a storage medium interface 1130, and a storage medium 1140.

The pattern sensing unit 1110 of FIG. 11 may include the processor 110 of FIG. 1, the processor 430 of FIG. 4A or 4B, or the first processor 910 of FIG. 9. Here, the present disclosure may not be limited to that, and the pattern sensing unit 1110 may include other components.

The pattern sensing unit 1110 may integrate a plurality of logical bands, which include consecutive Logical Block Addresses (LBAs) of data having the consecutive LBAs, into one logical band. The logical band may be mapped with the virtual bands, and the virtual band may include a plurality of tracks. The plurality of tracks may be partially overlapped by adjacent tracks, and data may be written using a shingle-write in which data is consecutively written in one direction.

For example, it is assumed that one logical band is mapped with one virtual band, and each logical band includes 100 LBAs. That is, it is assumed that a first logical band includes LBAs from "0" to "99", and a second logical band includes LBAs from "100" to "199". When receiving data having 150 consecutive LBAs (LBAs from "0" to "149") to be written, the LBAs of the received data are included in the first logical band and the second logical band. Hence, the pattern sensing unit 1110 integrates the first logical band with the second logical band so as to set one logical band having 200 LBAs. As another method, the pattern sensing unit 1110 may integrate logical bands, from the first logical band including the first LBA "0" of the data to the second logical band including the last LBA "149" of the data, into one logical band. When a write command for writing data is received, information related to the LBAs are received as well. Hence, the pattern sensing unit 1110 may integrate the logical bands based on the information related to the LBAs of the data to be written. The writing method according to one exemplary embodiment will be described in more detail with reference to FIG. 12, FIG. 13, FIG. 14B, FIG. 18 and FIG. 19.

The pattern sensing unit 1110 may store in the information storage unit 1120 mapping information, which includes information related to a range of the integrated logical band and information related to at least one virtual band mapped to the integrated logical band. For example, a portion of the information storage unit 1120, in which the mapping information including the information about the range of the integrated logical band and the information about the at least one virtual band mapped to the integrated logical band, may be the allocation queue 1020 of FIG. 9. The mapping information may also include mapping information between a logical block address and a virtual address of a written data. The mapping information will also be described in more detail with reference to FIGS. 18 and 19.

The pattern sensing unit 1110 may control the storage medium interface 1130 to write the received data. The storage medium interface 1130 may perform a write operation on the storage medium 1140 under the control of the pattern sensing unit 1110.

Data having consecutive LBAs may be received at once or in a divided manner. For example, after receiving a first data having consecutive LBAS from "00" to "150", a second data having consecutive LBAs from "151" to "250" may be received. Here, the pattern sensing unit 1110, as previously described in relation to the first data, may integrate a plurality of logical bands including the LBAs of the first data into one logical band. The pattern sensing unit 1110 may control the storage medium interface 1130 to write the succeedingly received second data to be consecutive to the first data. When there are a plurality of logical bands including LBAs of the second data, the pattern sensing unit 1110 may integrate the plurality of logical bands into one logical band. Data having consecutive LBAs may be received in a divided manner, which will also be described in more detail with reference to FIGS. 18 and 19.

Upon changing a range of the logical band as illustrated in the one exemplary embodiment, use of the virtual bands in response to an update operation to be performed later can be minimized. The update operation will be described in detail with reference to FIG. 15, FIG. 16B, and FIGS. 20 to 23.

When the written data having the consecutive LBAs becomes invalid, the integrated logical band may be divided into minimum logical bands.

FIG. 12 is a flowchart illustrating a writing method in accordance with one exemplary embodiment.

Referring to FIGS. 11 and 12, the pattern sensing unit 1110 may integrate a plurality of logical bands, which includes LBAs of data having the consecutive LBAs, into one logical band (S1210). The pattern sensing unit 1110 may control the storage medium interface 1130 to write the data onto at least one virtual band corresponding to the integrated one logical band (S1220). The pattern sensing unit 1110 may store in the information storage unit 1120 mapping information, which includes information related to a range of the integrated logical band and information related to the virtual bands mapped to the integrated logical band (S1230). The mapping information may further include mapping information between logical block addresses and virtual addresses of the written data. The steps S1210 and S1220 may be performed simultaneously or in a sequential manner.

FIG. 13 is a flowchart illustrating a writing method in accordance with another exemplary embodiment. FIG. 13 illustrates an exemplary embodiment that data having consecutive LBAs is received in a divided manner.

Referring to FIGS. 11 to 13, steps S1310 to S1330 are the same as the steps S1210 to S1230 of FIG. 12, so detailed description thereof will be omitted. When new data to be written is received after writing the data by performing those steps S1310 to S1330, it may be determined whether or not the received new data is consecutive to the written data (S1340). If it is determined at the step S1340 that the received data to be written is consecutive to the written data, the pattern sensing unit 1110 may control the storage medium interface 1130 to write the received data to be consecutive to the written data (S1350). Also, when the LBAs of the received data are included in a plurality of logical bands, the pattern sensing unit 1110 may integrate the plurality of logical bands into one logical band, and change the mapping information stored in the information storage unit 1120 (S1360). That is, the pattern sensing unit 1110 may store in the information storage unit 1120 information related to a range of the integrated logical band, information related to at least one virtual band mapped to the integrated logical band, and mapping information between the LBAs of the data written at the step S1350 and virtual addresses. The steps S1350 and S1360 may be performed simultaneously or in a sequential manner.

If it is determined at the step S1340 that the received data to be written is not consecutive to the written data, the pattern sensing unit 1110 may control the storage medium interface 1130 to write the received data onto a corresponding virtual band (S1370).

Figure 14A:
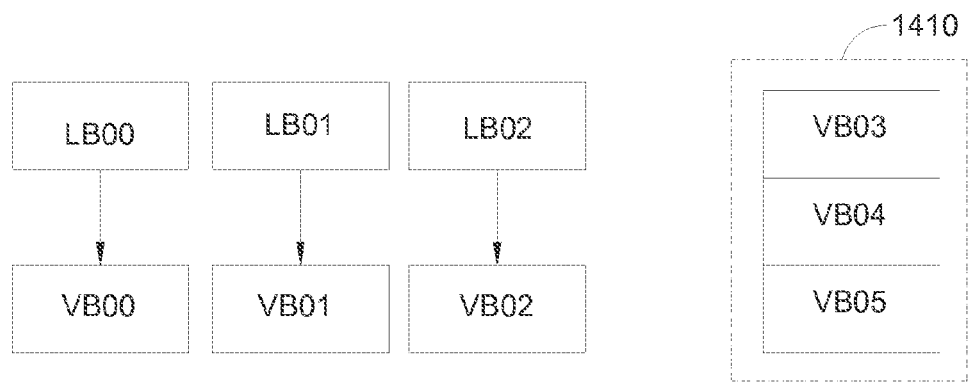
FIG. 14A is a view illustrating a mapping relation between a logical band and a virtual band according to the related art.
Figure 14B:
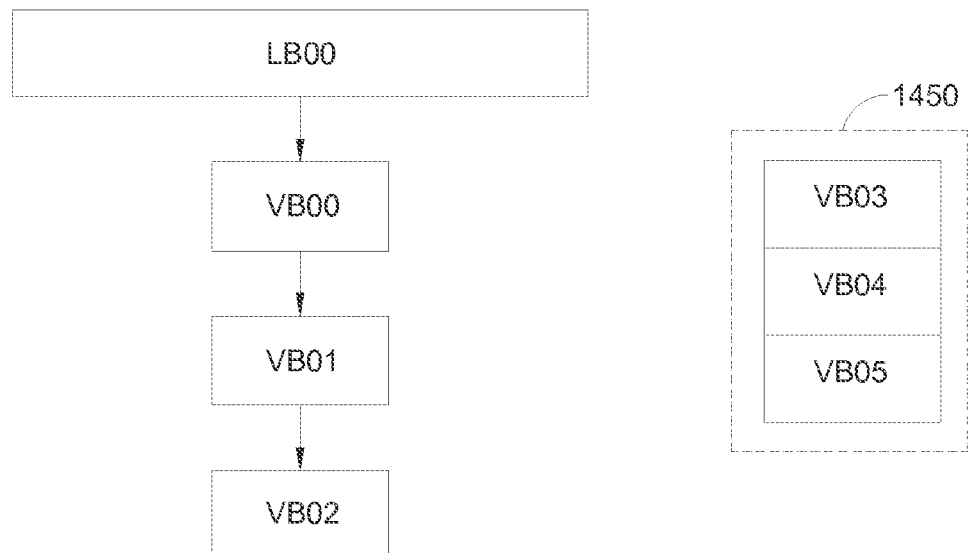
FIG. 14B is a view illustrating a mapping relation between a logical band and a virtual band in accordance with one exemplary embodiment of the present disclosure.

FIG. 14A is a view illustrating a mapping relation between a logical band and a virtual band according to the related art, and FIG. 14B is a view illustrating a mapping relation between a logical band and a virtual band in accordance with one exemplary embodiment of the present disclosure. Hereinafter, it is assumed that data having consecutive LBAs is to be written on virtual bands VA00, VA01, VA02, for the sake of explanation.

Referring to FIG. 14A, in the related at, the logical band and the virtual band has one-to-one mapping relation. The logical band and the virtual band do not have to always have the same size, but one logical band is mapped to one virtual band. That is, a logical band LB00 may be mapped to the virtual band VB00, a logical band LB01 may be mapped to the virtual band VB01, and a logical band LB02 may be mapped to the virtual band VB02. A reference number 1410 indicates virtual bands in a free band state in which valid data is not stored. That is, virtual bands VB03, VB04 and VB05 are in the free band state.

Referring to FIG. 14B, since a range of a logical band changes according to a range of data having consecutive LBAs according to one exemplary embodiment of the present disclosure, the logical band LB00 may have a range, which is three times greater than that of the logical band LB00 of FIG. 14A. That is, according to the one exemplary embodiment of the present disclosure, the logical band LB00 may be an integrated logical band of logical bands LB00, LB01 and LB02 of FIG. 14A. In the exemplary embodiment of FIG. 14B, the logical band LB00 may be mapped with virtual bands VB00, VB01, VB02. A reference number 1450 indicates virtual bands in a free band state in which valid data is not stored. That is, each of the virtual bands VB03, VB04, VB05 is in the free band state.

FIG. 15 is a flowchart illustrating a writing method for updating the written data after performing the write operation in accordance with one exemplary embodiment. Hereinafter, description will be given of an operation of updating the written data after performing a write operation as illustrated in FIG. 12 or 13.

Referring to FIGS. 11 to 15, it may first be determined whether or not to update the written data (S1510). According to the determination result of the step S1510, when a first update data for updating part of the written data is received, the pattern sensing unit 1110 may control the storage medium interface 1130 to write the first update data onto another at least one virtual band (S1520). Alternatively, the pattern sensing unit 1110 may control the storage medium interface 1130 to write the first update data to be consecutive to the written data. After performing the step S1520, the pattern sensing unit 1110 may change mapping information related to the updated data and store the changed mapping information in the information storage unit 1120 (S1530). The mapping information may include information related to the another at least one virtual band mapped to the logical band and mapping information between LBAs of the data written at the step S1520 and virtual addresses. Here, mapping information between the LBAs of data, which was written in correspondence with the updated data, and virtual addresses may be deleted.

Afterwards, when a second update data for updating part of the data written at the step S1510 is received, the pattern sensing unit 1110 may control the storage medium interface 1130 to write the second update data onto the last virtual band where the first update data has been written (S1520). For example, at the step S1520, the pattern sensing unit 1110 may control the storage medium interface 1130 to write the second update data to be consecutive to the written first update data. When the step S1520 is performed with respect to the second update data, the pattern sensing unit 1110 may change mapping information related to the updated data and store the changed mapping information in the information storage unit 1120 (S1530). The mapping information may include information related to the another at least one virtual band mapped to the logical band and mapping information between LBAs of the data written at the step S1520 and virtual addresses. Here, mapping information between the LBAs of data, which was written in correspondence with the updated data, and virtual addresses may be deleted.

As described above, when update data is received and an update operation is performed later, the steps S1520 and S1530 may be performed. And, the received update data may be written consecutive to a previously written update data.

Figure 16A:
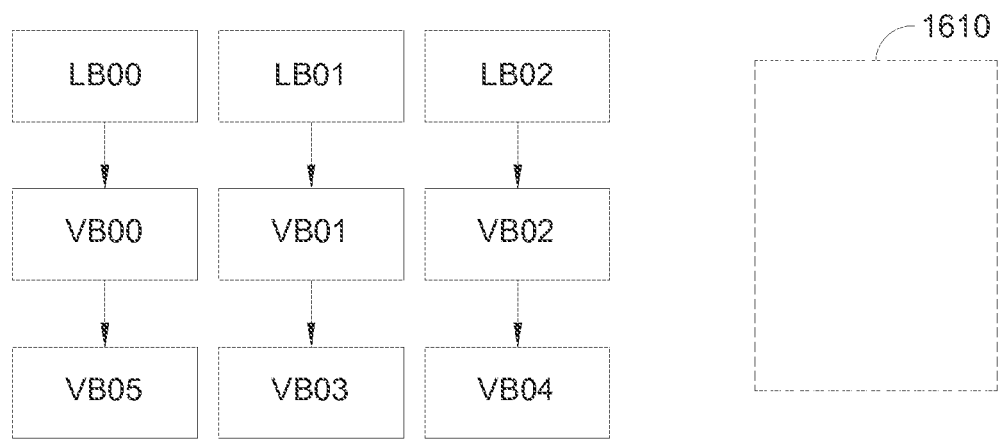
FIG. 16A is a view illustrating a mapping relation between a logical band and a virtual band when an update operation is performed according to the related art.
Figure 16B:
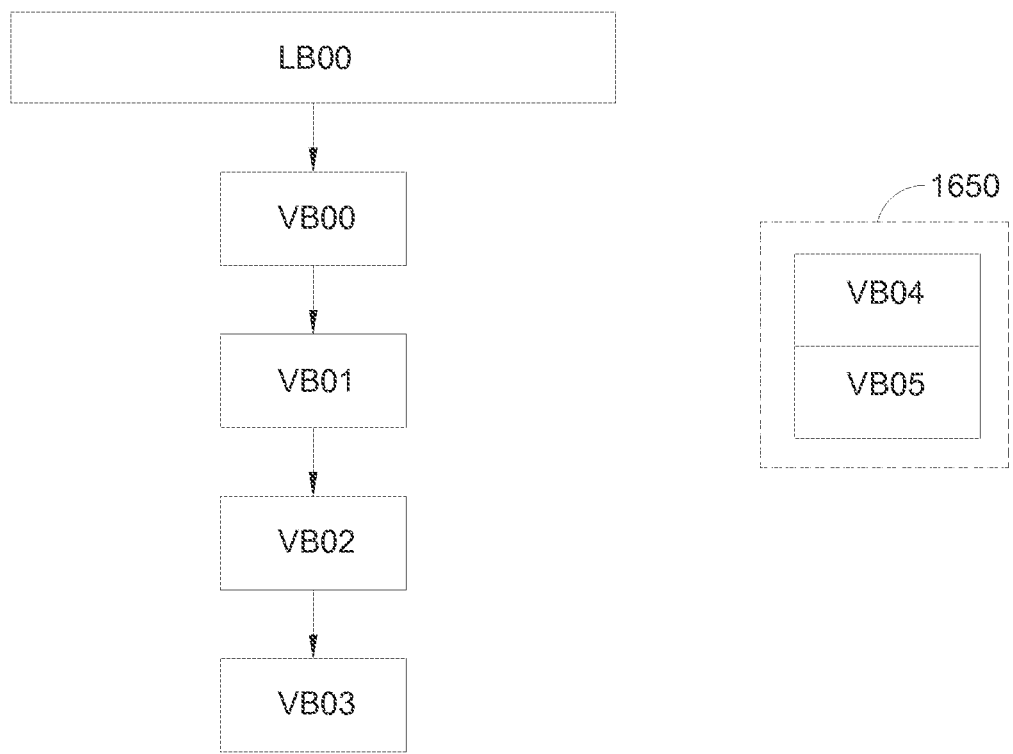
FIG. 16B is a view illustrating a mapping relation between a logical band and virtual band when an update operation is performed in accordance with one exemplary embodiment of the present disclosure.

FIG. 16A is a view illustrating a mapping relation between a logical band and a virtual band when an update operation is performed according to the related art, and FIG. 16B is a view illustrating a mapping relation between a logical band and a virtual band when an update operation is performed in accordance with one exemplary embodiment of the present disclosure. Hereinafter, it is assumed that a first update data for updating part of data written on the virtual band VB01, a second update data for updating part of data written on the virtual band VB02, and a third update data for updating part of data written on the virtual band VB00 are sequentially received, for the sake of explanation.

FIG. 16A illustrates that an update operation is performed after a write operation is performed, as illustrated in FIG. 14A. Referring to FIG. 16A, when the first update data for updating part of data written on the virtual band VB01 is received, the first update data is written onto the virtual band VB03 which was in the free band state, and the logical band LB01 is mapped to the virtual band VB03. Afterwards, when the second update data for updating part of data written on the virtual band VB02 is received, the second update data is written onto the virtual band VB04 which was in the free band state, and the logical band LB02 is mapped to the virtual band VB04. Finally, when the third update data for updating part of data written on the virtual band VB00 is received, the third update data is written onto the virtual band VB05, which was in the free band state, and the logical band LB00 is mapped to the virtual band VB05.

FIG. 16B illustrates that an update operation is performed after a write operation is performed, as illustrated in FIG. 14B, according to one exemplary embodiment. Referring to FIG. 16B, when the first update data for updating part of data written on the virtual band VB01 is received, the first update data is written onto the virtual band VB03 which was in the free band state and the logical band LB01 is mapped to the virtual band VB03. Afterwards, when the second update data for updating part of data written on the virtual band VB02 is received, the second update data may be written onto the virtual band VB03 to be consecutive to the first update data written on the virtual band VB03. Finally, when the third update data for updating part of data written on the virtual band VB00 is received, the third update data may be written onto the virtual band VB03 to be consecutive to the second update data written on the virtual band VB03. It is assumed in FIG. 16B that the sum of first to third update data does not exceed the virtual band VB03. If the sum of first to third update data exceeds the virtual band VB03, the exceeded update data may be written onto the virtual band VB04 in the free band state.

As illustrated in the related art of FIG. 16A, since the logical band and the virtual band has the one-to-one mapping relation, it requires a plurality of virtual bands for performing the update operation. However, according to the one exemplary embodiment as illustrated in FIG. 16B, since virtual bands of the written data is mapped to one logical band, only one virtual band may be further required to perform the update operation. When the added virtual band has completely written with data, a new virtual band may be added again. Therefore, according to the one exemplary embodiment, the number of virtual bands required in response to the update operation can be minimized as compared with the related art. Also, when there is a lack of virtual bands in the free band state as illustrated in FIG. 16A, data written on virtual bands should first be merged to one virtual band so as to ensure a virtual band in the free band state. However, according to the one exemplary embodiment as illustrated in FIG. 16B, the virtual bands in the free band state can be ensured even by performing the merge operation less times than the related art.

FIG. 17 is a view illustrating virtual bands for explaining a write operation in accordance with one exemplary embodiment with reference to FIGS. 18 to 23.

As illustrated in FIG. 17, it is assumed that each of virtual bands VB00, VB01, VB02, and VB03 includes 25 data sectors, and there are logical bands having the same size as the virtual bands VB00, VB01, VB02, and VB03. That is, it is assumed that each of the virtual bands VB00, VB01, VB02, and VB03 includes data sectors SN00 to SN24 corresponding to the virtual addresses 0 to 24, respectively, and each of the logical bands includes LBAs 0 to 24. Here, the present disclosure may not be limited to this, and each virtual band may include a different number of data sectors. Also, FIGS. 18 to 23 assume that the logical band and the virtual band have the same size. However, the present disclosure may not be limited to this. Alternatively, the logical band and the virtual band have different sizes from each other. The example that the virtual band and the logical band have different sizes will be described with reference to FIGS. 27 to 28B.

Figure 18:
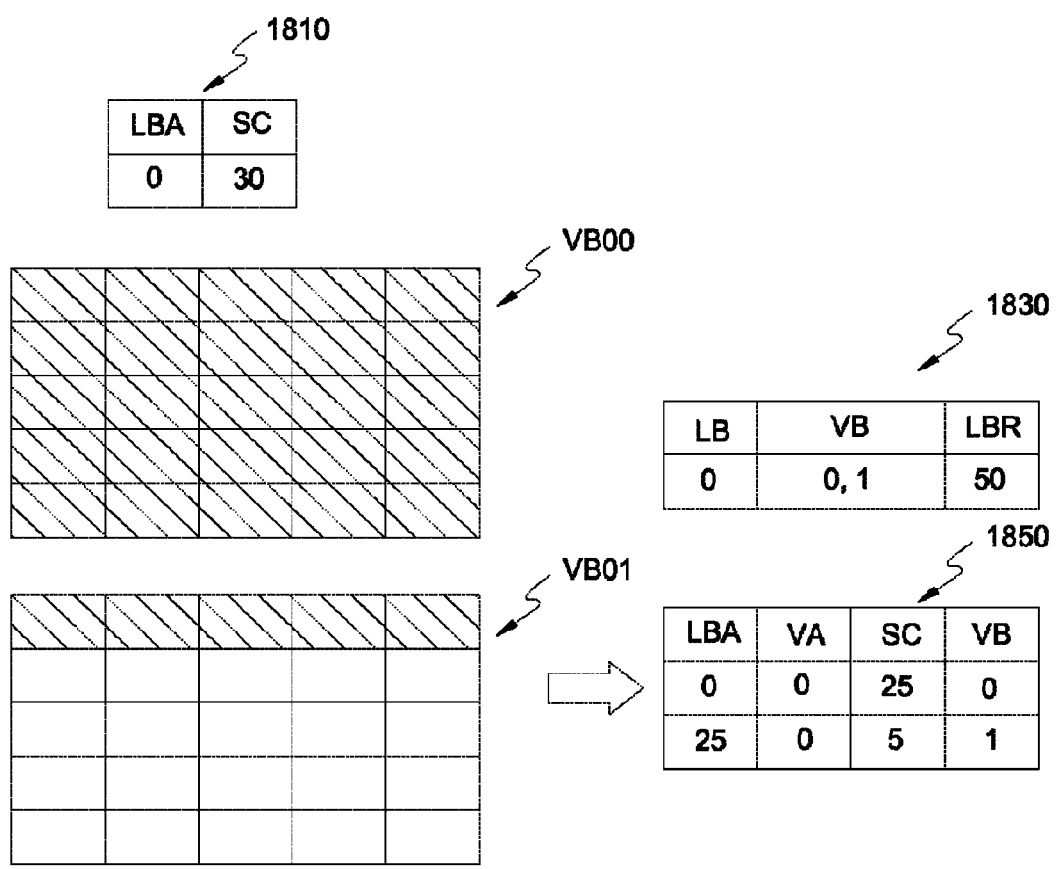
FIG. 18 is a view illustrating the write operation of FIG. 12 in accordance with the one exemplary embodiment.

FIG. 18 is a view illustrating the write operation of FIG. 12 in accordance with the one exemplary embodiment. Hereinafter, the write operation according to the one exemplary embodiment will be described with reference to FIG. 11, FIG. 12, FIG. 17 and FIG. 18.

First, it is assumed that a write command for writing a first data corresponding to 30 consecutive LBAs, starting from LBA "0", as illustrated by a reference numeral 1810. "LBA" in 1810 indicates a first LBA of the first data, and "SC" indicates the number of consecutive LBAs from the first LBA. Here, the LBAs 0 to 29 of the first data are included in two logical bands, accordingly, the pattern sensing unit 1110 may integrate the two logical bands. For example, the pattern sensing unit 1110 may integrate a logical band which includes LBAs 0 to 24 of the first data and a logical band which includes LBAs 25 to 29 of the first data into one logical band. As another example, the pattern sensing unit 1110 may integrate logical bands, from a logical band including the first LBA "0" of the first data to a logical band including the last LBA "29" of the first data, into one logical band. The first data may be written on the virtual bands VB00, VB01. The pattern sensing unit 1110 may set, as illustrated by 1830, information VB related to the virtual bands VB00, VB01 mapped to the integrated logical band LB "0", and range information (LBR) related to the logical band LB00, thus to store in the information storage unit 1120. Since the two logical bands each including 25 LBAs have been integrated with each other, the range information LBR of the logical band LB00 may be "50".

The pattern sensing unit 1110 may control the storage medium interface 1130 to write the first data, starting from the virtual address "0" corresponding to the data sector SN00 of the virtual band VB00. A remaining data of the first data, which is left without being written on the virtual band VB00, may be written, starting from a virtual address "0" corresponding to the data sector SN00 of the virtual band VB01. When performing the write operation, the pattern sensing unit 1110 may generate mapping information 1850 between the LBAs and the virtual addresses of the written first data and store the generated mapping information 1850 in the information storage unit 1120. In the mapping information 1850, "LBA" indicates the first LBA of the consecutively written data, and "VA" indicates a virtual address corresponding to the first LBA. Also, in the mapping information 1850, "SC" indicates whether data corresponding to what number of consecutive LBAs from the first LBA has been written on what number of data sectors from a data sector corresponding to the virtual address VA, and "VB" indicates a virtual band including the virtual address VA.

That is, based on the mapping information 1850 between the LBAs and virtual addresses of the written first data, it can be understood that data corresponding to 25 consecutive LBAs, starting from the LBA 0, is stored in 25 data sectors, starting from a data sector corresponding to the virtual address VA "0" of the virtual band "0" (VB00), and data corresponding to 5 consecutive LBAs, starting from the LBA "25", is stored in 5 data sectors, starting from a data sector corresponding to the virtual address VA "0" of the virtual band "1" (VB01).

Figure 19:
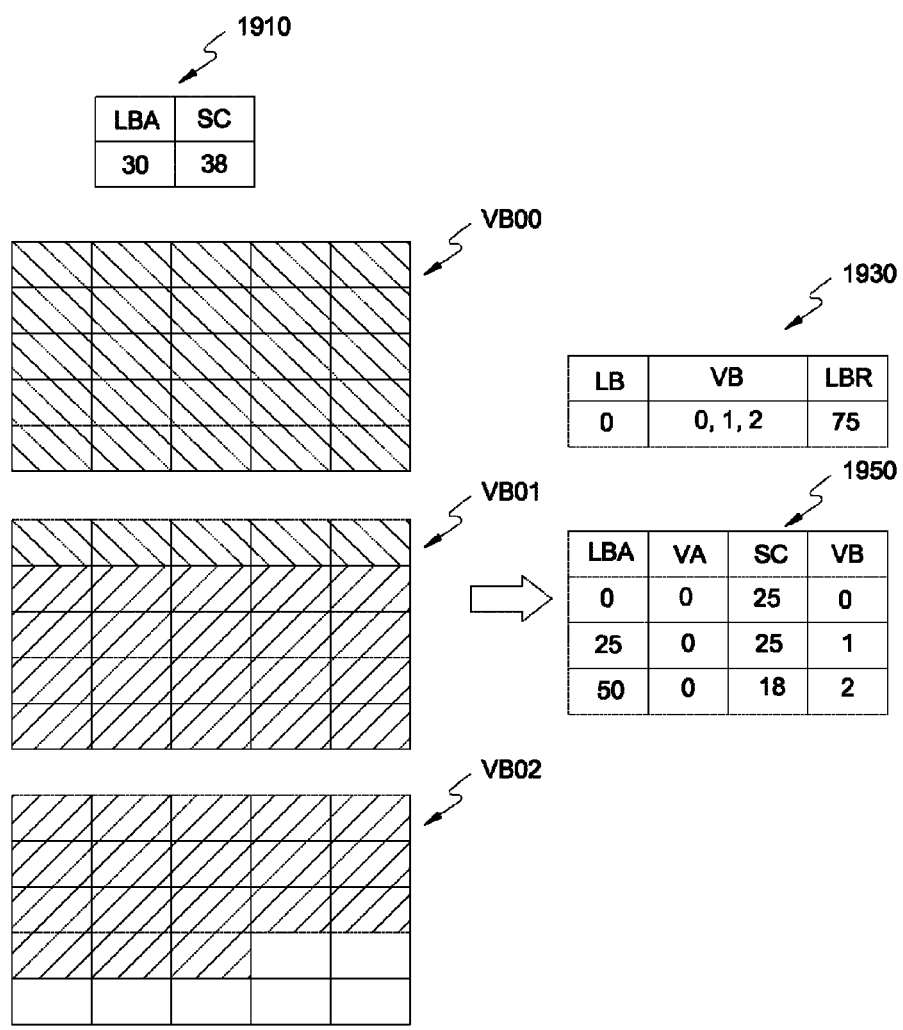
FIG. 19 is a view illustrating the write operation of FIG. 13 in accordance with the another exemplary embodiment.

FIG. 19 is a view illustrating the write operation of FIG. 13 in accordance with the another exemplary embodiment. Hereinafter, the write operation according to the another exemplary embodiment will be described with FIG. 11, FIG. 12, FIG. 13, and FIGS. 17 to 19.

First, it is assumed that a write command for writing a second data corresponding to 38 consecutive LBAs, starting from LBA "30", as illustrated by 1910, has been received after performing the write operation described with reference to FIG. 18. In the information 1910, "LBA" indicates a first LBA of the second data, and "SC" indicates the number of consecutive LBAs, starting from the first LBA. Here, LBAs 30 to 67 of the second data are included in two logical bands, accordingly, the pattern sensing unit 1110 may integrate the two logical bands. That is, the pattern sensing unit 1110 may integrated another one logical band with the logical band LB0 integrated in FIG. 18. For example, the pattern sensing unit 1110 may integrate a logical band including LBAs 30 to 49 of the second data and a logical band including LBAs 50 to 67 of the second data into one logical band. As another example, the pattern sensing unit 1110 may integrate logical bands, from a logical band including the first LBA "30" of the second data to a logical band including the last LBA "67" of the second data, into one logical band. The second data may be written on the virtual band VB02 as well as an area where the data of the virtual band VB01 is not stored. The pattern sensing unit 1110 may set, as illustrated by 1930, information VB related to the virtual bands VB00, VB01, VB02 mapped to the integrated logical band "0" (LB0), and range information (LBR) related to the logical band LB00, thus to store in the information storage unit 1120. Since the integrated logical band includes the logical band LB0 including 50 LBAs and the logical band including 25 LBAs, the range information LBR of the logical band LB00 may be "75".

The pattern sensing unit 1110 may control the storage medium interface 1130 to write the second data, starting from the virtual address "5" corresponding to the data sector SN05 of the virtual band VB01, which is a data sector after the first data is written. A remaining data of the second data, which is left without being written on the virtual band VB01, may be written, starting from a virtual address "0" corresponding to the data sector SN00 of the virtual band VB02. When performing the write operation, the pattern sensing unit 1110 may generate mapping information 1950 between the LBAs and the virtual addresses of the written second data and store the generated mapping information 1950 in the information storage unit 1120. In the mapping information 1950, "LBA" indicates the first LBA of the consecutively written data, and "VA" indicates a virtual address corresponding to the first LBA. Also, in the mapping information 1950, "SC" indicates whether data corresponding to what number of consecutive LBAs from the first LBA has been written on what number of data sectors from a data sector corresponding to the virtual address VA, and "VB" indicates a virtual band including the virtual address VA.

That is, based on the mapping information 1950 between the LBAs and virtual addresses of the written second data, it can be understood that data corresponding to 25 consecutive LBAs, starting from the LBA 0, is stored in 25 data sectors, starting from a data sector corresponding to the virtual address VA "0" of the virtual band "0" (VB00), data corresponding to 25 consecutive LBAs, starting from the LBA "25", is stored in 25 data sectors, starting from a data sector corresponding to the virtual address VA "0" of the virtual band "1" (VB01), and data corresponding to 18 consecutive LBAS, starting from LBA "50", is stored in 18 data sectors, starting from a data sector corresponding to the virtual address VA "0" of the virtual band "2" (VB02).

When the written data in FIGS. 18 and 19 all become invalid, the pattern sensing unit 1110 may delete information related to the range of the logical band from the information storage unit 1120. The pattern sensing unit 1110 may divide the integrated logical band into minimum logical bands, change information related to a range of the divided logical bands, and store the changed information in the information storage unit 1120. For example, in the exemplary embodiment of FIGS. 18 and 19, when the written data all become invalid, the pattern sensing unit 1110 may change the range information related to the logical band stored in the information storage unit 1120 into "25".

Figure 20:
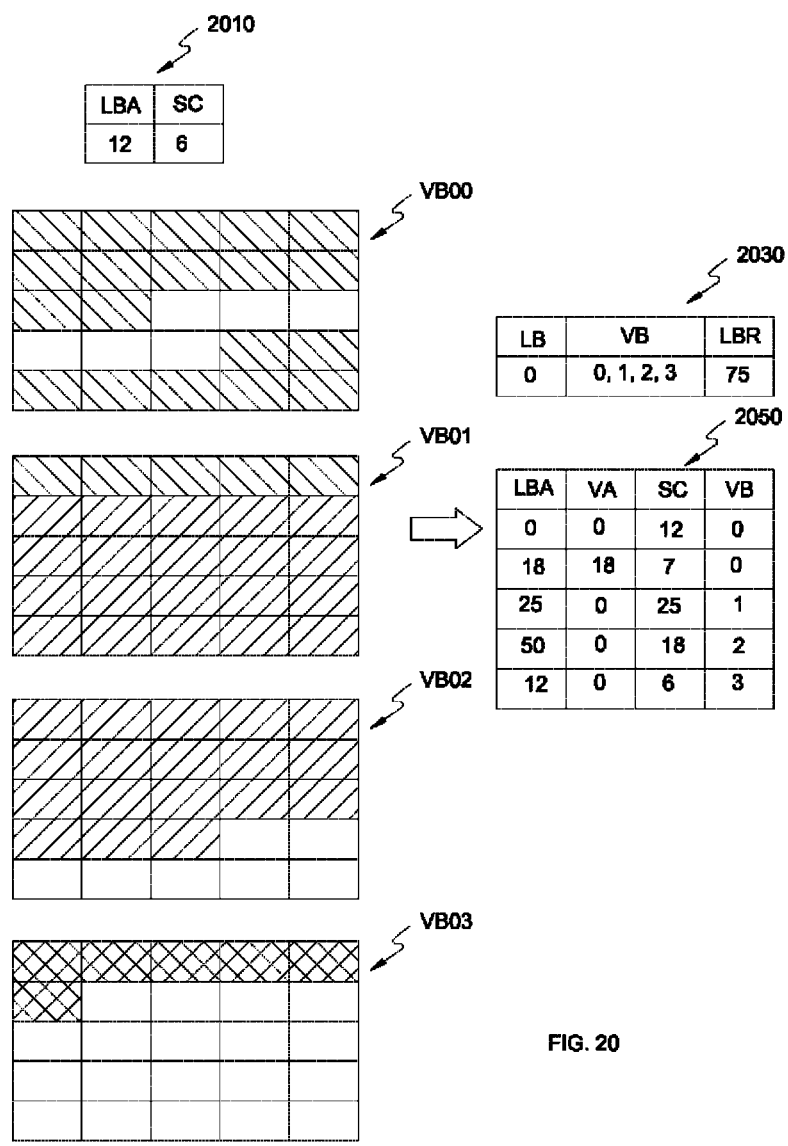
FIG. 20 is a view illustrating the update operation of FIG. 15 in accordance with the one exemplary embodiment.

FIG. 20 is a view illustrating the update operation of FIG. 15 in accordance with the one exemplary embodiment. Hereinafter, the update operation according to the one exemplary embodiment will be descried with reference to FIG. 11, FIG. 12, FIG. 15 and FIGS. 17 to 20.

First, it is assumed that after performing write operations described with reference to FIGS. 18 and 19, as illustrated by a reference number 2010, a write command for updating a third data corresponding to 6 consecutive LBAs, starting from LBA "12", has been received. In the information 2010, "LBA" indicates a first LBA of update data for updating the third data, and "SC" indicates the number of consecutive LBAs, starting from the first LBA. Here, the third data is a data written on the virtual band VB00, accordingly, the pattern sensing unit 1110 may control the storage medium interface 1130 to write data for updating the third data, starting from the virtual address "0" corresponding to a data sector SN00 of a new virtual band VB03. Also, the pattern sensing unit 1110 may include information related to the virtual band VB03 to the information stored in the information storage unit 1120 as illustrated by 1930 of FIG. 19, so as to change the information 1930 into information 2030. Here, this is to update data which has been written, other than receiving new data having consecutive LBAs. Therefore, the range information LBR related to the logical band LB00 may not change.

In response to the update data being written, the pattern sensing unit 1110 may change the mapping information stored in the information storage unit 1120 as illustrated by 1950 into mapping information as illustrated by 2050, by reflecting mapping information between LBAs and virtual addresses of the updated data. In the mapping information 2050, "LBA" indicates the first LBA of the consecutively written data, and "VA" indicates a virtual address corresponding to the first LBA. Also, in the mapping information 2050, "SC" indicates whether data corresponding to what number of consecutive LBAs from the first LBA has been written on what number of data sectors from a data sector corresponding to the virtual address VA, and "VB" indicates a virtual band including the virtual address VA.

That is, based on the mapping information 2050, it can be understood that data corresponding to 12 consecutive LBAs, starting from LBA "0", is stored in 12 data sectors, starting from a data sector corresponding to the virtual address VA "0" of the virtual band "0" (VB00), and data corresponding to 7 consecutive LBAs, starting from the LBA "18", is stored in 7 data sectors, starting from a data sector corresponding to the virtual address "18" of the virtual band "0" (VB00). Also, based on the mapping information 2050, it can be understood that data corresponding to 25 consecutive LBAs, starting from LBA "25", is stored in 25 data sectors, starting from a data sector corresponding to the virtual address VA "0" of the virtual band "1" (VB01), data corresponding to 18 consecutive LBAs, starting from LBA "50", is stored in 18 data sectors, starting from a data sector corresponding to the virtual address VA "0" of the virtual band "2" (VB02), and data corresponding to 6 consecutive LBAs, starting from LBA "12", is stored in 6 data sectors, starting from a data sector corresponding to the virtual address VA "0" of the virtual band "3" (VB03).

Figure 21:
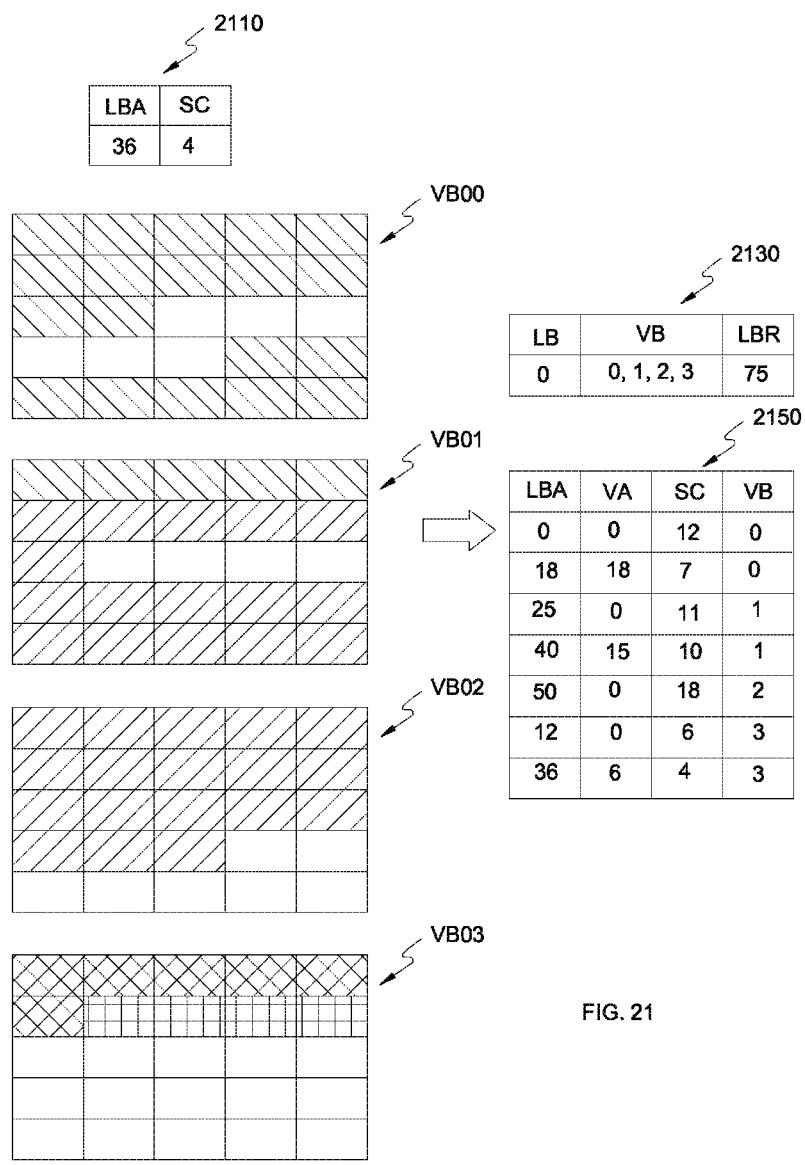
FIG. 21 is another view illustrating the update operation of FIG. 15 in accordance with the one exemplary embodiment.

FIG. 21 is another view illustrating the update operation of FIG. 15 in accordance with the one exemplary embodiment. Hereinafter, the update operation according to the one exemplary embodiment will be described with reference to FIG. 11, FIG. 12, FIG. 15 and FIGS. 17 to 21.

First, it is assumed that after performing the write operations described with reference to FIGS. 18 and 19 and then performing the update operation described with reference to FIG. 20, a write command for updating a fourth data corresponding to 4 consecutive LBAs, starting from LBA "36", as illustrated by 2110, has been received. In the information 2110, "LBA" indicates a first LBA of update data for updating the fourth data, and "SC" indicates the number of consecutive LBAs, starting from the first LBA. Here, the fourth data is a data written on the virtual band VB01, accordingly, the pattern sensing unit 1110 may control the storage medium interface 1130 to write data for updating the fourth data, consecutive to the data for updating the third data, starting from the virtual address "6" corresponding to a data sector SN06 of a new virtual band VB03. Here, since there is no added virtual band and the range of the logical band LB00 has not changed, information 2130 stored in the information storage unit 1120 may not change, so it can be the same as the information 2030 of FIG. 20.

In response to the update data being written, the pattern sensing unit 1110 may change the mapping information as illustrated by 2050, which is stored in the information storage unit 1120, into mapping information as illustrated by 2150, by reflecting mapping information between LBAs and virtual addresses of the updated data. In the mapping information 2150, "LBA" indicates the first LBA of the consecutively written data, and "VA" indicates a virtual address corresponding to the first LBA. Also, in the mapping information 2150, "SC" indicates whether data corresponding to what number of consecutive LBAs from the first LBA has been written on what number of data sectors from a data sector corresponding to the virtual address VA, and "VB" indicates a virtual band including the virtual address VA.

That is, based on the mapping information 2150, it can be understood that data corresponding to 12 consecutive LBAs, starting from LBA "0", is stored in 12 data sectors, starting from a data sector corresponding to the virtual address VA "0" of the virtual band "0" (VB00), and data corresponding to 7 consecutive LBAs, starting from the LBA "18", is stored in 7 data sectors, starting from a data sector corresponding to the virtual address "18" of the virtual band "0" (VB00). Also, based on the mapping information 2150, it can be understood that data corresponding to 11 consecutive LBAs, starting from LBA "25", is stored in 11 data sectors, starting from a data sector corresponding to the virtual address VA "0" of the virtual band "1" (VB01), and data corresponding to 10 consecutive LBAs, starting from LBA "40", is stored in 10 data sectors, starting from a data sector corresponding to the virtual address VA "15" of the virtual band "1" (VB01). Also, based on the mapping information 2150, it can be understood that data corresponding to 18 consecutive LBAs, starting from LBA "50", is stored in 18 data sectors, starting from a data sector corresponding to the virtual address VA "0" of the virtual band "2" (VB02), data corresponding to 6 consecutive LBAs, starting from LBA "12", is stored in 6 data sectors, starting from a data sector corresponding to the virtual address VA "0" of the virtual band "3" (VB03), and data corresponding to 4 consecutive LBAs, starting from LBA "36", is stored in 4 data sectors, starting from a data sector corresponding to the virtual address VA "6" of the virtual band "3" (VB03).

Figure 22:
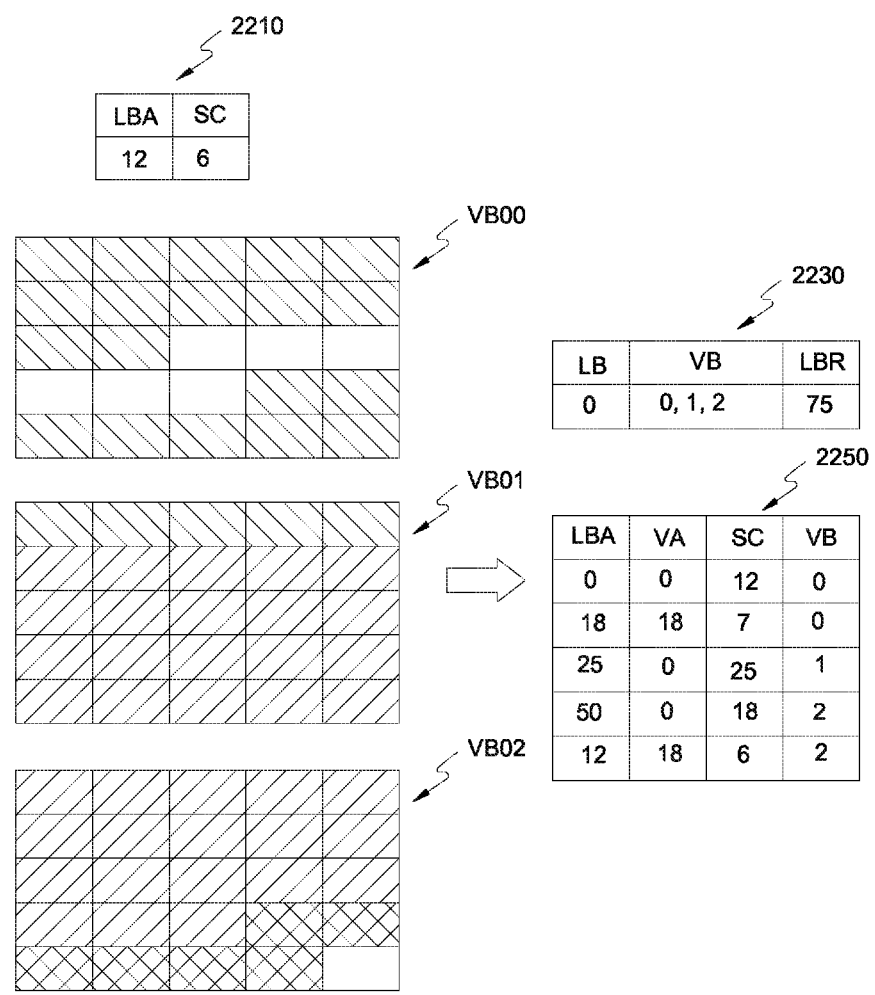
FIG. 22 is a view illustrating the update operation of FIG. 15 in accordance with the another exemplary embodiment.

FIG. 22 is a view illustrating the update operation of FIG. 15 in accordance with the another exemplary embodiment. Hereinafter, the update operation according to the another exemplary embodiment will be described with reference to FIG. 11, FIG. 12, FIG. 15 and FIGS. 17 to 22.

First, it is assumed that after performing the write operations described with reference to FIGS. 18 and 19, a write command for updating a third data corresponding to 6 consecutive LBAs, starting from LBA "12", as illustrated by 2210, has been received. In the information 2210, "LBA" indicates a first LBA of update data for updating the third data, and "SC" indicates the number of consecutive LBAs, starting from the first LBA. Here, unlike to the example of FIG. 20, the pattern sensing unit 1110 may control the storage medium interface 1130 to write update data for the third data, starting from the virtual address "18" corresponding to a data sector SN18, in which data is not stored, among data sectors of the virtual band VB02. Here, since there is no added virtual band and the range of the logical band LB00 has not changed, information 2230 stored in the information storage unit 1120 may not change, so it can be the same as the information 1930 of FIG. 19.

In response to the update data being written, the pattern sensing unit 1110 may change the mapping information as illustrated by 1950, which is stored in the information storage unit 1120, into mapping information as illustrated by 2250, by reflecting mapping information between LBAs and virtual addresses of the updated data. In the mapping information 2250, "LBA" indicates the first LBA of the consecutively written data, and "VA" indicates a virtual address corresponding to the first LBA. Also, in the mapping information 2250, "SC" indicates whether data corresponding to what number of consecutive LBAs from the first LBA has been written on what number of data sectors from a data sector corresponding to the virtual address VA, and "VB" indicates a virtual band including the virtual address VA.

That is, based on the mapping information 2250, it can be understood that data corresponding to 12 consecutive LBAs, starting from LBA "0", is stored in 12 data sectors, starting from a data sector corresponding to the virtual address VA "0" of the virtual band "0" (VB00), and data corresponding to 7 consecutive LBAs, starting from the LBA "18", is stored in 7 data sectors, starting from a data sector corresponding to the virtual address "18" of the virtual band "0" (VB00). Also, based on the mapping information 2250, it can be understood that data corresponding to 25 consecutive LBAs, starting from LBA "25", is stored in 25 data sectors, starting from a data sector corresponding to the virtual address VA "0" of the virtual band "1" (VB01), data corresponding to 18 consecutive LBAs, starting from LBA "50", is stored in 18 data sectors, starting from a data sector corresponding to the virtual address VA "0" of the virtual band "2" (VB02), and data corresponding to 6 consecutive LBAs, starting from LBA "12", is stored in 6 data sectors, starting from a data sector corresponding to the virtual address VA "18" of the virtual band "2" (VB02).

Figure 23:
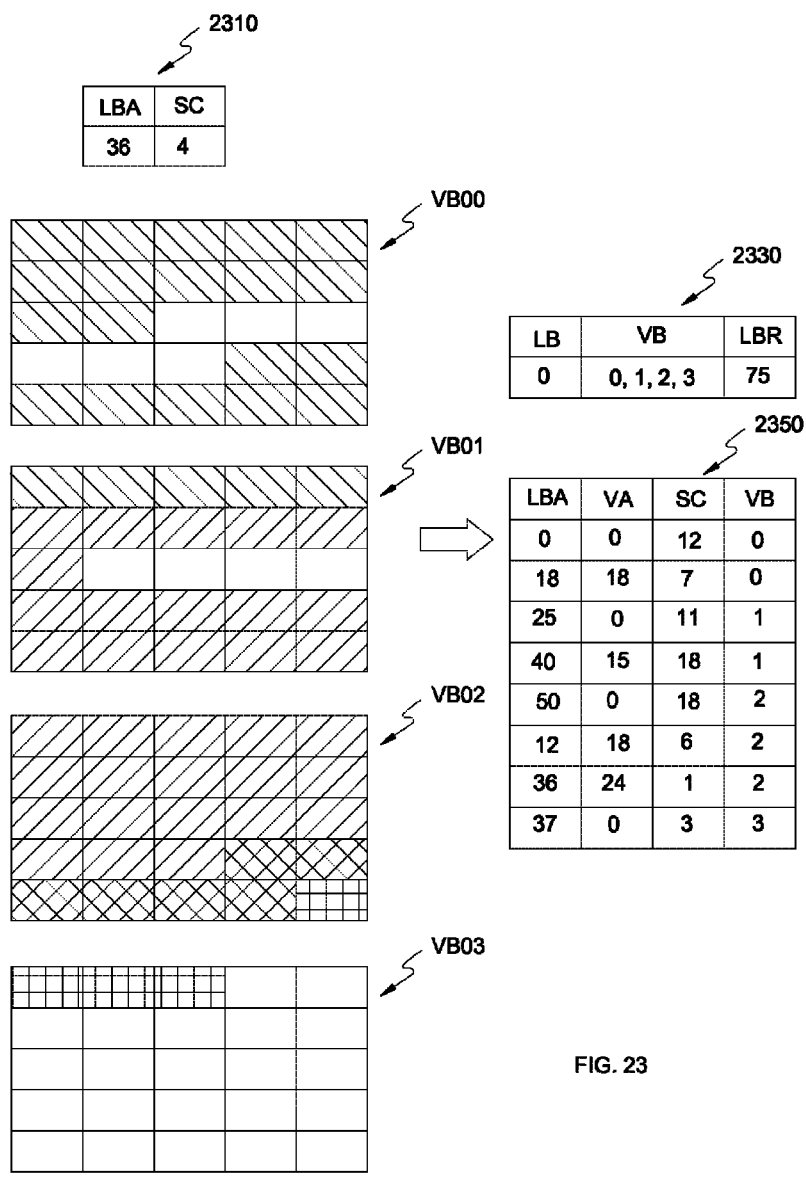
FIG. 23 is another view illustrating the update operation of FIG. 14 in accordance with the another exemplary embodiment.

FIG. 23 is another view illustrating the update operation of FIG. 15 in accordance with the another exemplary embodiment. Hereinafter, the update operation according to the another exemplary embodiment will be described with reference to FIG. 11, FIG. 12, FIG. 15 and FIGS. 17 to 23.

First, it is assumed that after performing the write operations described with reference to FIGS. 18 and 19 and then performing the update operation described with reference to FIG. 22, a write command for updating a fourth data corresponding to 4 consecutive LBAs, starting from LBA "36", as illustrated by 2310, has been received. In the information 2310, "LBA" indicates a first LBA of update data for updating the fourth data, and "SC" indicates the number of consecutive LBAs, starting from the first LBA. Here, the fourth data is a data written on the virtual band VB01, accordingly, the pattern sensing unit 1110 may control the storage medium interface 1130 to write data for updating the fourth data, consecutive to the data written on the virtual band VB01, starting from the virtual address "24" corresponding to a data sector SN24 of a new virtual band VB02. Here, the pattern sensing unit 1110 may control the storage medium interface 1130 to write the remaining data of the update data for updating the fourth data, left without being written on the virtual band VB02, to be written, starting from the virtual address "00" corresponding to a data sector SN00 of a new virtual band VB03. Also, the pattern sensing unit 1110 may include information related to the virtual band VB03 into the information stored in the information storage unit 1120 as illustrated by 1930 of FIG. 19, so as to change 1930 into 2330. Here, this is to update data which has been written, other than receiving new data having consecutive LBAs. Therefore, the range information LBR related to the logical band LB00 may not change.

In response to the update data being written, the pattern sensing unit 1110 may change the mapping information as illustrated by 2250, which is stored in the information storage unit 1120, into mapping information as illustrated by 2350, by reflecting mapping information between LBAs and virtual addresses of the updated data. In the mapping information 2350, "LBA" indicates the first LBA of the consecutively written data, and "VA" indicates a virtual address corresponding to the first LBA. Also, in the mapping information 2350, "SC" indicates whether data corresponding to what number of consecutive LBAs from the first LBA has been written on what number of data sectors from a data sector corresponding to the virtual address VA, and "VB" indicates a virtual band including the virtual address VA.

That is, based on the mapping information 2350, it can be understood that data corresponding to 12 consecutive LBAs, starting from LBA "0", is stored in 12 data sectors, starting from a data sector corresponding to the virtual address VA "0" of the virtual band "0" (VB00), and data corresponding to 7 consecutive LBAs, from the LBA "18", is stored in 7 data sectors, starting from a data sector corresponding to the virtual address "18" of the virtual band "0" (VB00). Also, based on the mapping information 2350, it can be understood that data corresponding to 11 consecutive LBAs, starting from LBA "25", is stored in 11 data sectors, starting from a data sector corresponding to the virtual address VA "0" of the virtual band "1" (VB01), and data corresponding to 10 consecutive LBAs, starting from LBA "40", is stored in 10 data sectors, starting from a data sector corresponding to the virtual address VA "15" of the virtual band "1" (VB01). Also, based on the mapping information 2350, it can be understood that data corresponding to 18 consecutive LBAs, starting from LBA "50", is stored in 18 data sectors, starting from a data sector corresponding to the virtual address VA "0" of the virtual band "2" (VB02), and data corresponding to 6 consecutive LBAs, starting from LBA "12", is stored in 6 data sectors, starting from a data sector corresponding to the virtual address VA "18" of the virtual band "2" (VB02). Also, based on the mapping information 2350, it can be understood that data corresponding to 1 consecutive LBA, starting from LBA "36", is stored in a data sector corresponding to the virtual address VA "24" of the virtual band "2" (VB02), and data corresponding to 3 consecutive LBAs, starting from LBA "37", is stored in 3 data sectors, starting from a data sector corresponding to the virtual address VA "0" of the virtual band "3" (VB03).

Even in FIGS. 20 to 23, when the written data and the updated data become invalid, the pattern sensing unit 1110 may delete the range information related to the logical band from the information storage unit 1120. The pattern sensing unit 1110 may change the range information related to the logical band so that the range of the logical band can be the same as a range of one virtual band. For example, in the exemplary embodiments of FIGS. 20 to 23, when the written data and the updated data all become invalid, the pattern sensing unit 1110 may change the range information related to the logical band stored in the information storage unit 1120 into "25".

Figure 24:
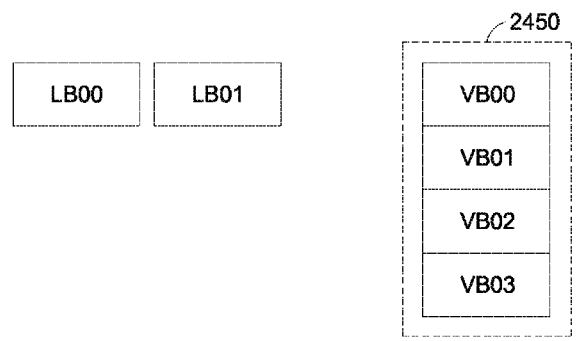
FIG. 24 is a view illustrating logical bands and virtual bands for explaining a write operation in accordance with one exemplary embodiment with reference to FIGS. 25 to 28B.

FIG. 24 is a view illustrating logical bands and virtual bands for explaining a write operation in accordance with one exemplary embodiment with reference to FIGS. 25 to 28B.

As illustrated in FIG. 24, it is assumed that logical bands LB00, LB01 are present, and virtual bands VB00, VB01, VB02, VB03 in a free band state, in which valid data is not stored, are present as illustrated by 2450.

Figure 25:
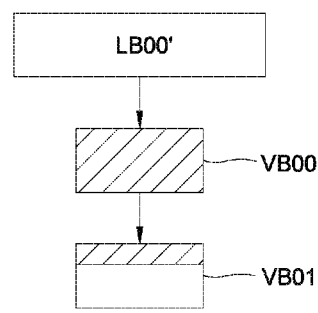
FIG. 25 is a view illustrating a mapping relation between a logical band and a virtual band in accordance with one exemplary embodiment.

FIG. 25 is a view illustrating a mapping relation between a logical band and a virtual band in accordance with one exemplary embodiment.

Hereinafter, a write operation according to one exemplary embodiment will be described with reference to FIGS. 11 to 13, and FIGS. 24 and 25. For the sake of explanation, it is assumed that the logical band LB00 includes LBAs 0 to 99, and the logical band LB01 includes LBAs 100 to 199. It is also assumed that each of the virtual bands VB00, VB01, VB02 and VB03 includes 100 virtual addresses.

For example, when data having 120 consecutive LBAs, starting from LBA "0", is written, the pattern sensing unit 1110 may integrate the logical bands LB00, LB01 having the LBAs into one logical ban LB00'. For example, the pattern sensing unit 1110 may integrate the logical band LB00 having the LBAs 0 to 99 of the data and the logical band LB01 having the LBAs 100 to 119 of the data into one logical band LB00'. As another example, the pattern sensing unit 1110 may integrate logical bands, from the logical band LB00 having the first LBA "0" of the data to the logical band LB01 having the last LBA "119" of the data, into one logical band LB00'.

The pattern sensing unit 1110 may control the storage medium interface 1130 to write the data onto data sectors corresponding to the virtual band VB00, VB01. The pattern sensing unit 1110 may generate information related to the virtual bands VB00, VB01 mapped to the integrated logical band LB00' and range information related to the integrated logical band LB00' and store the generated information in the information storage unit 1120. The integrated logical band LB00' includes the 200 LBAs from 0 to 199, so the range information related to the integrated logical band LB00' may be "200".

Figure 26A:
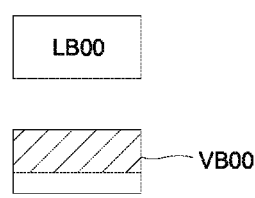
FIGS. 26A and 26B are views illustrating a mapping relation between a logical band and a virtual band in accordance with another exemplary embodiment.
Figure 26B:
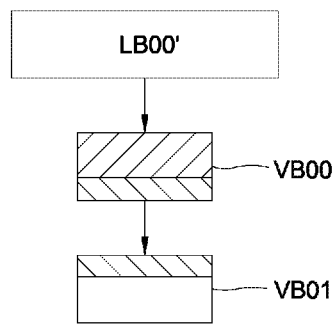

FIGS. 26A and 26B are views illustrating a mapping relation between a logical band and a virtual band in accordance with another exemplary embodiment.

Hereinafter, a write operation in accordance with one exemplary embodiment with reference to FIGS. 11 to 13, FIG. 24 and FIGS. 26A and 26B. For the sake of explanation, it is assumed that the logical band LB00 of FIG. 24 includes LBAs 0 to 99, and the logical band LB01 includes the LBAs 100 to 199. It is also assumed that the virtual bands VB00, VB01, VB02 and VB03 include 100 virtual addresses, respectively.

In FIG. 26A, when data having 80 consecutive LBAs, starting from LBA "0", is written, there is only one logical band LB00 having the LBAs. Therefore, the pattern sensing unit 1110 may not integrate the logical band. The pattern sensing unit 1110 may control the storage medium interface 1130 to write the data onto data sectors corresponding to the virtual band VB00, and store information related to the virtual band VB00 mapped to the logical band LB00 and range information related to the logical band LB00 in the information storage unit 1120. The logical band LB00 includes the 100 LBAs from 0 to 99, accordingly, the range information about the logical band LB00 may be "100".

In FIG. 26B, when data having 40 consecutive LBAs, starting from LBA "80", is written, the pattern sensing unit 1110 may integrate the logical bands LB00, LB01 including the LBAs into one logical band LB00'. For example, the pattern sensing unit 1110 may integrate the logical band LB00 including the LBAs 80 to 99 of the data and the logical band LB01 including the LBAs 100 to 119 of the data into one logical band LB00'. As another example, the pattern sensing unit 1110 may integrate logical bands, from the logical band LB00 having the first LBA "80" of the data to the logical band LB01 having the last LBA "119" of the data, into one logical band LB00'.

The pattern sensing unit 1110 may control the storage medium interface 1130 to write the data onto data sectors corresponding to the virtual bands VB00, VB01. The pattern sensing unit 1110 may generate information related to the virtual bands VB00, VB01 mapped to the integrated logical band LB00' and range information related to the integrated logical band LB00' and store the generated information in the information storage unit 1120. The integrated logical band LB00' includes the 200 LBAs from 0 to 199, so the range information related to the integrated logical band LB00' may be "200".

Figure 27:
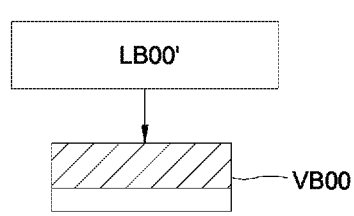
FIG. 27 is a view illustrating a mapping relation between a logical band and a virtual band in accordance with another exemplary embodiment.

FIG. 27 is a view illustrating a mapping relation between a logical band and a virtual band in accordance with another exemplary embodiment.

Hereinafter, a write operation in accordance with one exemplary embodiment with reference to FIGS. 11 to 13, FIGS. 24 and 27. For the sake of explanation, it is assumed that the logical band LB00 includes LBAs 0 to 99, and the logical band LB01 includes the LBAs 100 to 199. It is also assumed that the virtual bands VB00, VB01, VB02 and VB03 include 150 virtual addresses, respectively. That is, the exemplary embodiment of FIG. 27 illustrates that the size of each logical band LB00, LB01 is larger than the size of each virtual band VB00, VB01, VB02, VB03.

For example, when data having 130 consecutive LBAs, starting from LBA "0", is written, the pattern sensing unit 1110 may integrate the logical bands LB00, LB01 including the LBAs into one logical band LB00'. For example, the pattern sensing unit 1110 may integrate the logical band LB00 including the LBAs 0 to 99 of the data and the logical band LB01 including the LBAs 100 to 129 of the data into one logical band LB00'. As another example, the pattern sensing unit 1110 may integrate logical bands, from the logical band LB00 having the first LBA "0" of the data to the logical band LB01 having the last LBA "129" of the data, into one logical band LB00'.

The pattern sensing unit 1110 may control the storage medium interface 1130 to write the data onto data sectors corresponding to the virtual band VB00. The pattern sensing unit 1110 may generate information related to the virtual band VB00 mapped to the integrated logical band LB00' and range information related to the integrated logical band LB00' and store the generated information in the information storage unit 1120. The integrated logical band LB00' includes the 200 LBAs from 0 to 199, so the range information related to the integrated logical band LB00' may be "200".

Figure 28A:
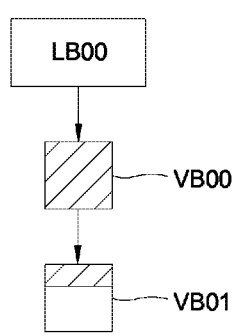
FIGS. 28A and 28B are views illustrating a mapping relation between a logical band and a virtual band in accordance with another exemplary embodiment.
Figure 28B:
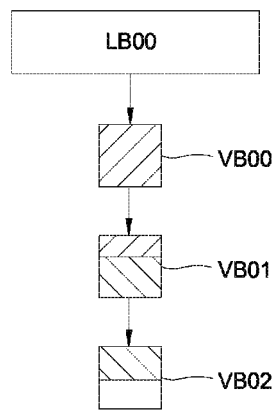

FIGS. 28A and 28B are views illustrating a mapping relation between a logical band and a virtual band in accordance with another exemplary embodiment.

Hereinafter, a write operation in accordance with one exemplary embodiment with reference to FIGS. 11 to 13, FIG. 24 and FIGS. 28A and 28B. For the sake of explanation, it is assumed that the logical band LB00 includes LBAs 0 to 99, and the logical band LB01 includes the LBAs 100 to 199. It is also assumed that the virtual bands VB00, VB01, VB02 and VB03 include 50 virtual addresses, respectively. That is, the exemplary embodiment of FIG. 28 illustrates that the size of each logical band LB00, LB01 is smaller than the size of each virtual band VB00, VB01, VB02, VB03.

In FIG. 28A, when data having 70 consecutive LBAs, starting from LBA "0", is written, there is only one logical band LB00 having the LBAs. Therefore, the pattern sensing unit 1110 may not integrate the logical band. The pattern sensing unit 1110 may control the storage medium interface 1130 to write the data onto data sectors corresponding to the virtual bands VB00, VB01, and store information related to the virtual bands VB00, VB01 mapped to the logical band LB00 and range information related to the logical band LB00 in the information storage unit 1120. The logical band LB00 includes the 100 LBAs from 0 to 99, accordingly, the range information about the logical band LB00 may be "100".

In FIG. 28B, when data having 50 consecutive LBAs, starting from LBA "70", is written, the pattern sensing unit 1110 may integrate the logical bands LB00, LB01 including the LBAs into one logical band LB00'. For example, the pattern sensing unit 1110 may integrate the logical band LB00 including the LBAs 70 to 99 of the data and the logical band LB01 including the LBAs 100 to 129 of the data into one logical band LB00'. As another example, the pattern sensing unit 1110 may integrate logical bands, from the logical band LB00 having the first LBA "70" of the data to the logical band LB01 having the last LBA "129" of the data, into one logical band LB00'.

Figure 29:
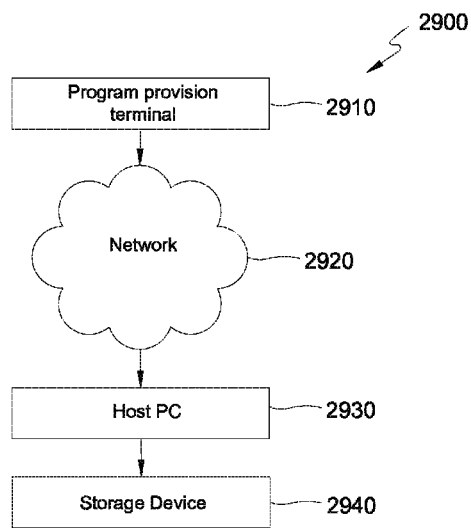
FIG. 29 is a construction view of a network system for illustrating a writing method on a storage device via a network in accordance with one exemplary embodiment.

FIG. 29 is a construction view of a network system 2900 for illustrating a writing method on a storage device via a network in accordance with one exemplary embodiment.

As illustrated in FIG. 29, a network system 2900 may include a program providing terminal 2910, a network 2920, a host PC 2930 and a storage device 2940.

The network 2920 may be implemented as a communication network such as an Internet or the like. Alternatively, the network 2920 may be implemented as a wireless communication network as well as a wired communication network.

The program providing terminal 2910 may store a write operation program according to the flowcharts illustrated in FIG. 12, FIG. 13 and FIG. 15. The program providing terminal 2910 may perform a process of transmitting a read operation control program or a write operation control program to the host PC 2930 according to a program transmission request by the host PC 2930, which is connected thereto via the network 2920.

The host PC 2930 may include hardware and software for requesting for transmission of the read operation control program or the write operation control program after being connected to the program providing terminal 2910 via the network 2920, and downloading the requested program from the program providing terminal 2910. The host PC 630 may execute the writing method according to the flowcharts illustrated in FIG. 12, FIG. 13 and FIG. 15 by the program downloaded from the program providing terminal 2910.

The writing method in accordance with the one exemplary embodiment has been described with reference to FIGS. 11 to 28B, so detailed description thereof will be omitted.

In some embodiments, a method for writing data on at least one virtual band including a plurality of tracks may comprise: integrating a plurality of logical bands into one logical band, the plurality of logical bands including logical block addresses of data having the consecutive logical block addresses; and writing the data onto at least one virtual band corresponding to the integrated one logical band.

There may be embodiments of the method wherein the integrating step is performed to integrate logical bands, from a logical band including a first logical block address of the data to a logical band including a last logical block address of the data, into the one logical band.

The example method may further comprise writing a plurality of update data into at least one virtual band in a consecutive manner, the plurality of update data being received to update the written data.

The example method may further comprise writing update data, consecutive to the written data, the update data being received to update the written data; and writing a remaining update data consecutively onto another at least one virtual band, when the update data is written fully up to a last data sector of the virtual band at the step of writing the update data consecutive to the written data.

The example method may further comprise generating mapping information including information related to the at least one virtual band corresponding to the integrated logical band and information related to a range of the integrated logical band.

In some embodiments, a storage device may comprise a storage medium including a plurality of virtual bands, each having a plurality of tracks in which data is stored; a storage medium interface configured to read data stored in the storage medium or write data on the storage medium; and a pattern sensing unit configured to integrate a plurality of logical bands including logical block addresses of data having the consecutive logical block addresses into one logical band, the pattern sensing unit controlling the storage medium interface to write the data onto at least one virtual band corresponding to the integrated logical band.

There may be embodiments of the device wherein the pattern sensing unit integrates logical bands, from a logical band including a first logical block address of the data to a logical band including a last logical block address of the data, into the one logical band.

There may be embodiments of the device wherein the pattern sensing unit writes update data, consecutive to the written data, the update data being received to update the written data, and controls the storage medium interface to write a remaining update data consecutively onto another at least one virtual band when the update data is written fully up to a last data sector of the virtual band.

There may be embodiments of the device wherein when data has been written on the at least one virtual band, the pattern sensing unit controls the storage medium interface to write the data, having the logical block addresses included in the integrated logical band onto the at least one virtual band, to be consecutive to the written data.

There may be embodiments of the device wherein the pattern sensing unit generates mapping information including information related to the at least one virtual band corresponding to the integrated logical band and information related to a range of the integrated logical band, wherein the storage device further comprises an information storage unit configured to store the mapping information.

The present disclosure may be executed as a method, an apparatus, a system and the like. When being executed as software, components of the present disclosure may be code segments for executing necessary tasks. Programs or code segments may be stored in a program-readable medium. Examples of the program-readable medium may include an electronic circuit, a semiconductor memory device, ROM, a flash memory, an Erasable ROM (EROM), a floppy disk, an optical disk, a hard disk and the like.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus comprising:
    a processor configured to:
        receive a single write command including data to be written to a plurality of logical block addresses (LBAs);
        determine if the plurality of LBAs includes LBAs from a first logical band and a second logical band of a data storage medium, the first logical band is a range of consecutive LBAs of the data storage medium unique from LBAs of the second logical band;
        when the plurality of LBAs includes LBAs from the first and the second logical bands,
            combine the first and the second logical bands into a single logical band based on the single write command;
            write the data to the single logical band; and
            separate the single logical band into the first and the second logical bands when the data written to the plurality of LBAs becomes invalid.

2. The apparatus of claim 1, further comprising the processor further configured to:
update an address map when the first and the second logical bands are combined; and
update an address map when the single logical band is separated.

3. The method of claim 2, further comprising the processor further configured to:
allocate at least one virtual band to the single logical band,
wherein a virtual band includes a range of virtual addresses,
wherein a virtual address is used to map an LBA to a physical storage location of the data storage medium; and
write the data to virtual addresses of the at least one virtual band.

4. The apparatus of claim 3, further comprising the processor further configured to:
allocate virtual bands to the single logical band, the virtual bands having been allocated to the first and the second logical bands prior to the combining; and
allocate the virtual bands from the single logical band to the first and the second logical bands after separating the single logical band.

5. The apparatus of claim 4, further comprising the processor further configured to write the data to tracks of a disk data storage medium in a shingled manner where a first track is partially overwritten by a second track.

6. The apparatus of claim 5, further comprising the processor further configured to:
write the data to the virtual addresses of the at least one virtual band in a consecutive manner such that virtual addresses corresponding to a track that is partially overwritten cannot be modified.

7. A method comprising:
receiving a write command including data to be written to a plurality of logical block addresses (LBAs);
determining if the plurality of LBAs includes LBAs from a first logical band and a second logical band, the first logical band is a range of consecutive LBAs of a data storage medium unique from LBAs of the second logical band;
when the plurality of LBAs includes LBAs from the first and the second logical bands,
combining the first and the second logical bands into a single logical band;
writing the data to the single logical band; and
separating the single logical band into the first and the second logical bands when the data written to the plurality of LBAs becomes invalid.

8. The method of claim 7, further comprising:
updating an address map when the first and the second logical bands are combined; and
updating an address map when the single logical band is separated.

9. The method of claim 8, further comprising:
allocating at least one virtual band to the single logical band,
wherein a virtual band includes a range of virtual addresses,
wherein a virtual address is used to map an LBA to a physical storage location of the data storage medium; and
writing the data to virtual addresses of the at least one virtual band.

10. The method of claim 9, further comprising:
allocating virtual bands to the single logical band, the virtual bands having been allocated to the first and the second logical bands prior to the combining; and
allocating the virtual bands from the single logical band to the first and the second logical bands after separating the single logical band.

11. The method of claim 10, further comprising writing the data to tracks of a disk data storage medium in a shingled manner where a first track is partially overwritten by a second track.

12. The method of claim 11, further comprising:
writing the data to the virtual addresses of the at least one virtual band in a consecutive manner such that virtual addresses corresponding to a track that is partially overwritten cannot be modified.

13. A memory device storing instructions to cause a processor to execute a method comprising:
receiving a write command including data to be written to a plurality of logical block addresses (LBAs);
determining if the plurality of LBAs includes LBAs from a first logical band and a second logical band, the first logical band is a range of consecutive LBAs of a data storage medium unique from LBAs of the second logical band;
when the plurality of LBAs includes LBAs from the first and the second logical bands,
combining the first and the second logical bands into a single logical band;
writing the data to the single logical band; and
separating the single logical band into the first and the second logical bands when the data written to the plurality of LBAs becomes invalid.

14. The memory device of claim 13, the method further comprising:
updating an address map when the first and the second logical bands are combined; and
updating an address map when the single logical band is separated.

15. The memory device of claim 14, the method further comprising:
allocating at least one virtual band to the single logical band,
wherein a virtual band includes a range of virtual addresses,
wherein a virtual address is used to map an LBA to a physical storage location of the data storage medium; and
writing the data to virtual addresses of the at least one virtual band.

16. The memory device of claim 15, the method further comprising:
allocating virtual bands to the single logical band, the virtual bands having been allocated to the first and the second logical bands prior to the combining; and
allocating the virtual bands from the single logical band to the first and the second logical bands after separating the single logical band.

17. The memory device of claim 16, the method further comprising:
writing the data to tracks of a disk data storage medium in a shingled manner where a first track is partially overwritten by a second track; and
writing the data to the virtual addresses of the at least one virtual band in a consecutive manner such that virtual addresses corresponding to a track that is partially overwritten cannot be modifie.

* * * * *